United States Patent
Fang et al.

(10) Patent No.: US 12,155,106 B2
(45) Date of Patent: Nov. 26, 2024

(54) PHASE SHIFTER AND ANTENNA

(71) Applicant: BOE TECHNOLOGY GROUP CO., LTD., Beijing (CN)

(72) Inventors: Jia Fang, Beijing (CN); Feng Qu, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 666 days.

(21) Appl. No.: 17/598,601

(22) PCT Filed: Nov. 27, 2020

(86) PCT No.: PCT/CN2020/132240
§ 371 (c)(1),
(2) Date: Sep. 27, 2021

(87) PCT Pub. No.: WO2022/110013
PCT Pub. Date: Jun. 2, 2022

(65) Prior Publication Data
US 2023/0098813 A1    Mar. 30, 2023

(51) Int. Cl.
*H01P 1/18*        (2006.01)
*G02F 1/13*        (2006.01)
(Continued)

(52) U.S. Cl.
CPC ............... *H01P 1/184* (2013.01); *G02F 1/13* (2013.01); *H01P 3/081* (2013.01); *H01Q 3/36* (2013.01)

(58) Field of Classification Search
CPC . H01Q 3/36; H01P 3/081; H01P 1/184; G02F 1/1313
(Continued)

(56) References Cited

U.S. PATENT DOCUMENTS 9,484,613 B1    11/2016 Simons et al.
2021/0066772 A1*  3/2021 Wu .................... H01Q 3/36

FOREIGN PATENT DOCUMENTS

CN        107004946 A    8/2017
CN        110785891 A    2/2020
(Continued)

OTHER PUBLICATIONS

Markus Koeberle, et al., "Electrically Tunable Liquid Crystal Phase Shifter in Antipodal Finline Technology for Reconfigurable W-Band Vivaldi Antenna Array Concepts", Institute of Microwave Engineering and Photonics Technische Universitat Darmstadt, proceedings of the 5th European Conference on Antennas and Propagation.

*Primary Examiner* — Rakesh B Patel
(74) *Attorney, Agent, or Firm* — HOUTTEMAN LAW LLC

(57) ABSTRACT

A phase shifter includes opposite first and second substrates and a dielectric layer between the first and second substrates. The first substrate includes: a first base plate; a signal line and a reference electrode on a side of the first base plate proximal to the dielectric layer. The second substrate includes a second base plate, and at least one patch electrode on a side of the second base plate proximal to the dielectric layer. The phase shifter further includes first and second feeding structures connected to both ends of the signal line, respectively; the first feeding structure changes a transmission direction of a microwave signal through the signal line, so that the microwave signal is transmitted in a first direction; and the second feeding structure changes a transmission direction of the microwave signal through the signal line, so that the microwave signal is transmitted in a second direction.

20 Claims, 16 Drawing Sheets

(51) Int. Cl.
*H01P 3/08* (2006.01)
*H01Q 3/36* (2006.01)

(58) Field of Classification Search
USPC .................. 333/116, 128, 161, 157, 204, 205
See application file for complete search history.

(56) References Cited

FOREIGN PATENT DOCUMENTS

| | | | |
|---|---|---|---|
| CN | 110970718 | A | 4/2020 |
| CN | 111273470 | A | 6/2020 |
| CN | 111294425 | A | 6/2020 |
| CN | 111342173 | A | 6/2020 |
| CN | 111342174 | A | 6/2020 |
| CN | 111490451 | A | 8/2020 |
| CN | 111864317 | A | 10/2020 |
| TW | 202036977 | A | 10/2020 |
| WO | WO 2012124072 | A1 | 9/2012 |

\* cited by examiner

PHASE SHIFTER AND ANTENNA

CROSS-REFERENCE TO RELATED APPLICATIONS

This is a National Phase Application filed under 35 U.S.C. 371 as a national stage of PCT/CN2020/132240 filed on Nov. 27, 2020 the content of which is incorporated herein by reference in its entirety.

TECHNICAL FIELD

The present disclosure relates to the field of communication technology, and in particular to a phase shifter and an antenna.

BACKGROUND

A phase shifter is a device capable of adjusting a phase of a microwave signal, and is widely applied to the fields of radar, missile attitude control, accelerators, communication, instruments, and even music. For the phase shifter with an adjustable dielectric layer, the dielectric layer has different dielectric constants under different electric field strengths, so that the dielectric constant of the dielectric layer between a signal line and a patch electrode is changed by changing a voltage between the signal line and the patch electrode, such that the phase of the microwave signal is adjusted.

SUMMARY

The present disclosure is directed to solve at least one of the technical problems in the prior art, and provides a phase shifter, which realizes feeding in and feeding out of signals of the phase shifter through a first feeding structure and a second feeding structure, so as to solve the problem in which a transverse electric field of coplanar waveguide transmission lines is converted to a longitudinal electric field in the phase shifter adopting coplanar waveguide transmission lines, and to achieve a phase shifter with low transmission loss.

In a first aspect, an embodiment of the present disclosure provides a phase shifter, including: a first substrate and a second substrate opposite to each other, and a dielectric layer between the first substrate and the second substrate; wherein,
 the first substrate includes: a first base plate; a signal line and a reference electrode on a side of the first base plate proximal to the dielectric layer; and the signal line includes a main structure, and at least one branch structure connected to the main structure and along an extending direction of the main structure;
 the second substrate includes: a second base plate, and at least one patch electrode on a side of the second base plate proximal to the dielectric layer; the at least one patch electrode and the at least one branch structure are in a one-to-one correspondence with each other to form at least one variable capacitor; and orthographic projections of the at least one patch electrode and the at least one branch structure on the first base plate are at least partially overlapped with each other;
 the phase shifter further includes: a first feeding structure electrically connected to one end of the signal line, and a second feeding structure electrically connected to the other end of the signal line; the first feeding structure is configured to change a transmission direction of a microwave signal through the signal line, so that the microwave signal is transmitted in a first direction, which intersects with a plane in which the first base plate is located; the second feeding structure is configured to change a transmission direction of the microwave signal through the signal line, so that the microwave signal is transmitted in a second direction, which intersects with the plane in which the first base plate is located.

According to the phase shifter provided by the embodiment of the present disclosure, a signal line and a reference electrode form coplanar waveguide transmission lines. The first feeding structure and the second feeding structure are adopted to be connected to two ends of the signal line, so that the first feeding structure may convert a transverse electric field at one end of the signal line into a longitudinal electric field and transmit a signal from the signal line in a direction which is not parallel to a first base plate under the longitudinal electric field. Similarly, the second feeding structure may convert the transverse electric field at the other end of the signal line into a longitudinal electric field, and transmit the signal from the signal line in a direction which is not parallel to the first base plate under the longitudinal electric field, so that the conversion from the transverse electric field at the two ends of the coplanar waveguide transmission line to the longitudinal electric field is realized.

In some embodiments, the phase shifter further includes: a first waveguide structure corresponding to the first feeding structure; and an orthographic projection of the first feeding structure on the first base plate at least partially overlaps with an orthographic projection of a first port of the first waveguide structure on the first base plate.

In some embodiments, the phase shifter further includes: a second waveguide structure corresponding to the second feeding structure; and
 an orthographic projection of the second feeding structure on the first base plate at least partially overlaps an orthographic projection of a first port of the second waveguide structure on the first base plate.

In some embodiments, the orthographic projection of the first feeding structure on the first base plate is within the orthographic projection of the first port of the first waveguide structure on the first base plate; and/or the orthographic projection of the second feeding structure on the first base plate is within the orthographic projection of the first port of the second waveguide structure on the first base plate.

In some embodiments, the first waveguide structure is on a side of the first base plate distal to the dielectric layer and the second waveguide structure is on a side of the second base plate distal to the dielectric layer;
 or, the first waveguide structure and the second waveguide structure are both on the side of the second base plate distal to the dielectric layer, and the orthographic projection of the first waveguide structure on the second base plate does not overlap with the orthographic projection of the second waveguide structure on the second base plate.

In some embodiments, the phase shifter further includes: a first reflective structure and a second reflective structure;
 the first reflective structure is on a side of the first feeding structure distal to the first waveguide structure; an orthographic projection of the first reflective structure on the first base plate at least partially overlaps with the orthographic projection of the first port of the first waveguide structure on the first base plate and at least partially overlaps with the orthographic projection of the first feeding structure on the first base plate, and the first reflective structure is configured to reflect a microwave signal, which is radiated by the first feeding structure towards a side distal to the first waveguide structure, back into the first waveguide structure; and the second reflective structure is on a side of the second feeding structure distal to the second waveguide structure; an orthographic projection of the second reflective structure on the second base plate at least partially overlaps with an orthographic projection of the first port of the second waveguide structure on the second base plate, and at least partially overlaps with an orthographic projection of the second feeding structure on the second base plate, and the second reflective structure is configured to reflect a microwave signal, which is radiated by the second feeding structure towards a side distal to the second waveguide structure, back into the second waveguide structure.

In some embodiments, the first reflective structure is a waveguide structure and an orthographic projection of a first port of the first reflective structure on the first base plate at least partially overlaps with the orthographic projection of the first port of the first waveguide structure on the first base plate; and the second reflective structure is a waveguide structure, and an orthographic projection of a first port of the second reflective structure on the second base plate at least partially overlaps with the orthographic projection of the first port of the second waveguide structure on the second base plate.

In some examples, the first waveguide structure has at least one first sidewall which is connected together to form a waveguide cavity of the first waveguide structure; and/or the second waveguide structure has at least one second sidewall which is connected together to form a waveguide cavity of the second waveguide structure.

In some embodiments, the phase shifter further includes a first metal layer and a second metal layer; the first metal layer is on a side of the first base plate distal to the dielectric layer, and has a first cavity therein which defines the first waveguide structure; the second metal layer is on a side of the second base plate distal to the dielectric layer, and has a second cavity therein which defines the second waveguide structure; or the phase shifter further includes a second metal layer on the side of the second base plate distal to the dielectric layer; the second metal layer has a first cavity defining the first waveguide structure and a second cavity defining the second waveguide structure therein; and an orthographic projection of the first cavity on the second base plate does not overlap with an orthographic projection of the second cavity on the second base plate.

In some embodiments, the phase shifter further includes: a third substrate connected to a second port of the first waveguide structure; the third substrate includes a third base plate and a feeding transmission line on a side of the third base plate proximal to the first waveguide structure; and a first end of the feeding transmission line is connected to an external signal line, and a second end of the feeding transmission line extends to the second port of the first waveguide structure so as to feed signals into the first waveguide structure.

In some embodiments, an orthographic projection of the signal line on the first base plate does not overlap with the orthographic projections of the first port of the first waveguide structure and the first port of the second waveguide structure on the first base plate.

In some embodiments, the first feeding structure is a monopole electrode, and the first feeding structure and the signal line are in a same layer and are made of a same material; and/or the second feeding structure is a monopole electrode, and the second feeding structure and the signal line are in a same layer and are made of a same material.

In some embodiments, the signal line has at least one bending angle, the reference electrode has at least one bending angle, and the at least one bending angle of the reference electrode is in one-to-one correspondence with the at least one bending angle of the signal line.

In some embodiments, the reference electrode includes: a first sub-reference electrode and a second sub-reference electrode; the signal line is between the first sub-reference electrode and the second sub-reference electrode; an orthographic projection of each of the at least one patch electrode on the first base plate at least partially overlaps with orthographic projections of the first sub-reference electrode and the second sub-reference electrode on the first base plate.

In some embodiments, the first waveguide structure and/or the second waveguide structure has a filling medium therein, the filling medium being polytetrafluoroethylene.

In a second aspect, an embodiment of the present disclosure further provides an antenna including the above phase shifter.

In some embodiments, the phase shifter further includes: a second waveguide structure corresponding to the second feeding structure; the antenna further includes:

at least one radiation unit, one of which corresponds to the second port of the second waveguide structure of one of the at least one phase shifter.

In some embodiments, the radiation unit is a third waveguide structure including a first port close to the second waveguide structure and a second port away from the second waveguide structure, the first port of the third waveguide structure is connected to the second port of the second waveguide structure corresponding to the third waveguide structure; wherein, an aperture of the second port of the third waveguide structure is larger than that of the first port, and an aperture of a part of the third waveguide structure relatively distal to the second waveguide structure is not smaller than that of a part of the third waveguide structure relatively proximal to the second waveguide structure.

In some embodiments, the second waveguide structure includes four second sidewalls that are connected together to define a waveguide cavity of the second waveguide structure;

the third waveguide structure includes a third sidewall, and the third sidewall encloses a waveguide cavity of the third waveguide structure; and a shape of the waveguide cavity of the second waveguide structure gradually changes to a shape of the first port of the third waveguide cavity along a direction from the second waveguide cavity to the third waveguide cavity.

In some embodiments, the radiation unit is a radiation patch; the antenna further includes a fourth substrate, the second port of the second waveguide structure of the at least one phase shifter is connected to the fourth substrate, and the radiation patch is on a side of the fourth substrate distal to the second waveguide structure; and an orthographic projection of the radiation patch on the fourth substrate and an orthographic projection of the second port of the second waveguide structure corresponding to the radiation patch on the fourth substrate at least partially overlap with each other.

In some embodiments, the phase shifter further includes: a first waveguide structure corresponding to the first feeding structure; the antenna includes a plurality of radiation units and a plurality of phase shifters, wherein one radiation unit corresponds to the second port of the second waveguide structure of one of the plurality of phase shifters; and the first waveguide structures of the plurality of phase shifters are connected together to form a waveguide power distribution network which has a main port and a plurality of sub-ports, the main port of the waveguide power distribution network is connected to an external signal line, and the first port of each first waveguide structure serves as a sub-port of the waveguide power distribution network.

BRIEF DESCRIPTION OF DRAWINGS

FIG. 2b is a cross-sectional view along a direction A-B in FIG. 2a.

FIG. 2f is a cross-sectional view along a direction E-F in FIG. 2a.

DETAIL DESCRIPTION OF EMBODIMENTS

Figure 1:
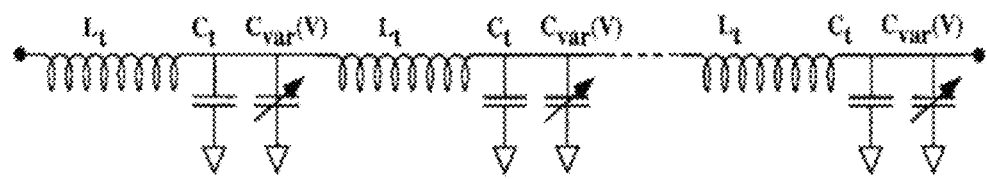
FIG. 1 is an equivalent model of transmission lines periodically loaded with variable capacitors in parallel.

In order to make the objects, technical solutions and advantages of the present invention more apparent, the present invention will be described in further detail with reference to the accompanying drawings. Obviously, the described embodiments are only part, not all, of the embodiments in the present invention. All other embodiments, which may be obtained by one of ordinary skill in the art without any creative effort based on the embodiments in the present invention, belong to the protection scope of the present invention.

Shapes and sizes of components in the drawings are not to scale, but are merely intended to facilitate an understanding of the embodiments of the present invention.

Unless defined otherwise, technical or scientific terms used herein should have the same meaning as commonly understood by one of ordinary skill in the art to which the present disclosure belongs. The terms of "first", "second", and the like used in the present disclosure are not intended to indicate any order, quantity, or importance, but rather are used for distinguishing one element from another. Further, the term "a", "an", "the", or the like does not denote a limitation of quantity, but rather denotes the presence of at least one element. The term of "comprising", "including", or the like, means that the element or item preceding the term contains the element or item listed after the term and the equivalent thereof, but does not exclude the presence of other elements or items. The term "connected", "coupled", or the like is not limited to physical or mechanical connections, but may include electrical connections, whether direct or indirect connections. The terms "upper", "lower", "left", "right", and the like are used merely for indicating relative positional relationships, and when the absolute position of an object being described is changed, the relative positional relationships may also be changed accordingly.

The embodiment of the present disclosure is not limited to the embodiments shown in the drawings, but includes modifications of configurations formed based on a manufacturing process. Thus, regions illustrated in the figures are schematic, and their shapes illustrate specific shapes of regions where elements are located, but are not intended to be limiting.

It should be noted that, if variable capacitors in parallel are periodically loaded on transmission lines in the phase shifter, a phase is changed as a capacitance of the variable capacitor is changed. An equivalent model thereof is shown in FIG. 1. Where Lt and Ct are line inductance and line capacitance equivalent to the transmission lines in the phase shifter, respectively, and depend on characteristics of the transmission lines and a substrate. The variable capacitor Cvar(V) may be a capacitor of a Micro-Electro-Mechanical System (MEMS), a capacitor of a variable diode, or the like.

Figure 2A:
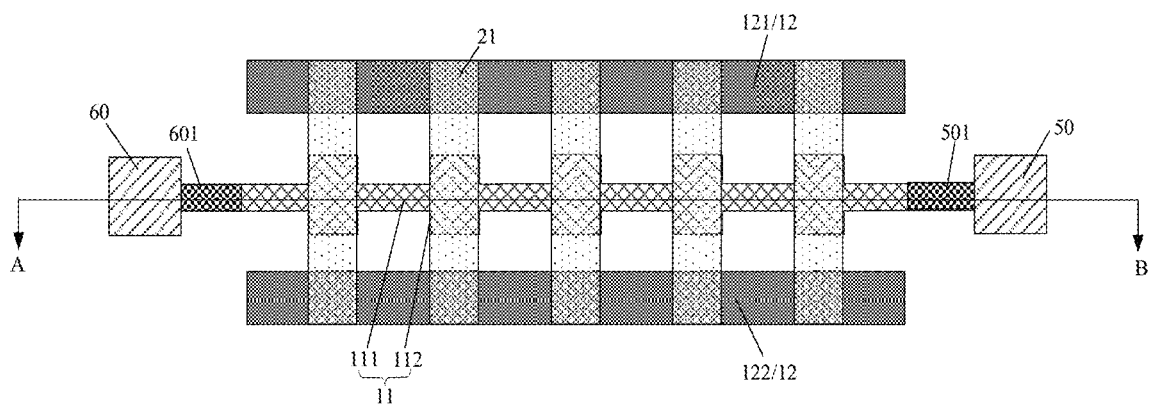
FIG. 2a is a top view of a phase shifter according to an embodiment of the present disclosure.
Figure 2B:
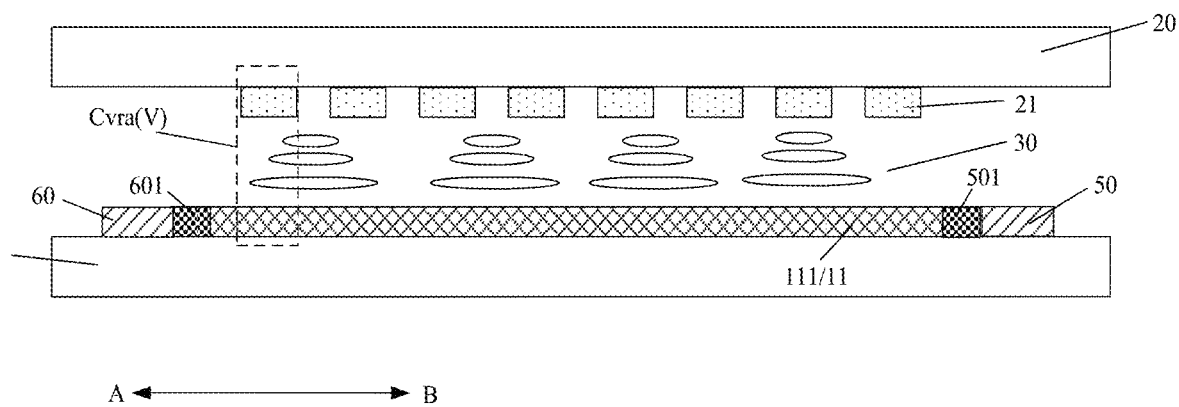
Figure 2C:
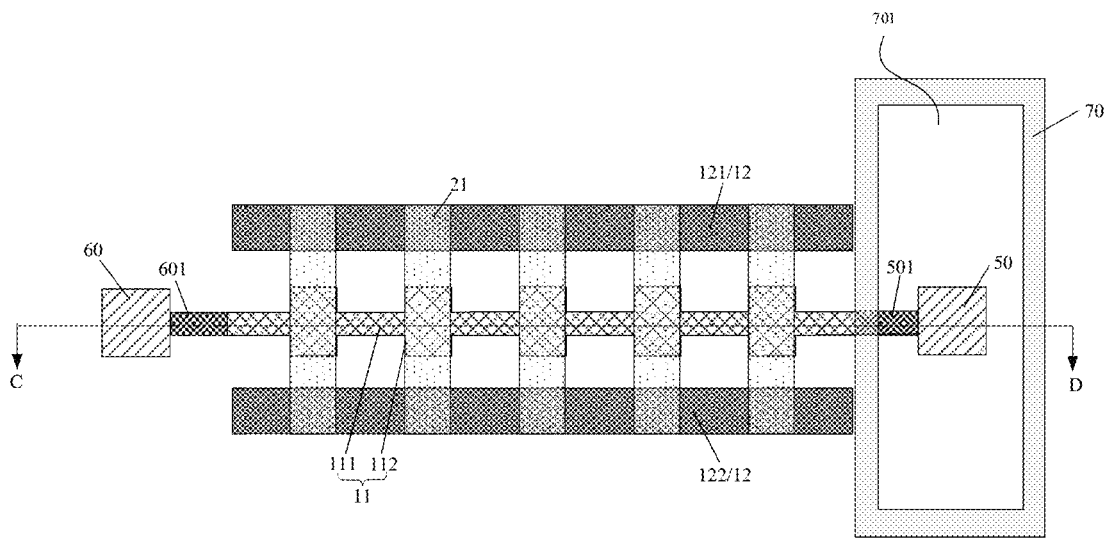
FIG. 2c is a top view of a phase shifter according to an embodiment of the present disclosure (a first waveguide structure).
Figure 2D:
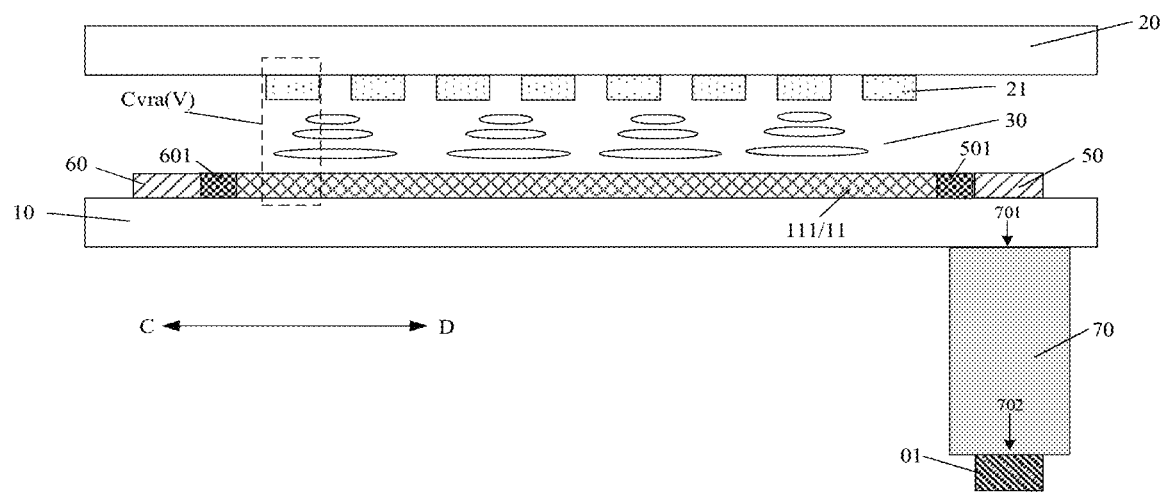
FIG. 2d is a cross-sectional view along a direction C-D in FIG. 2c.
Figure 2E:
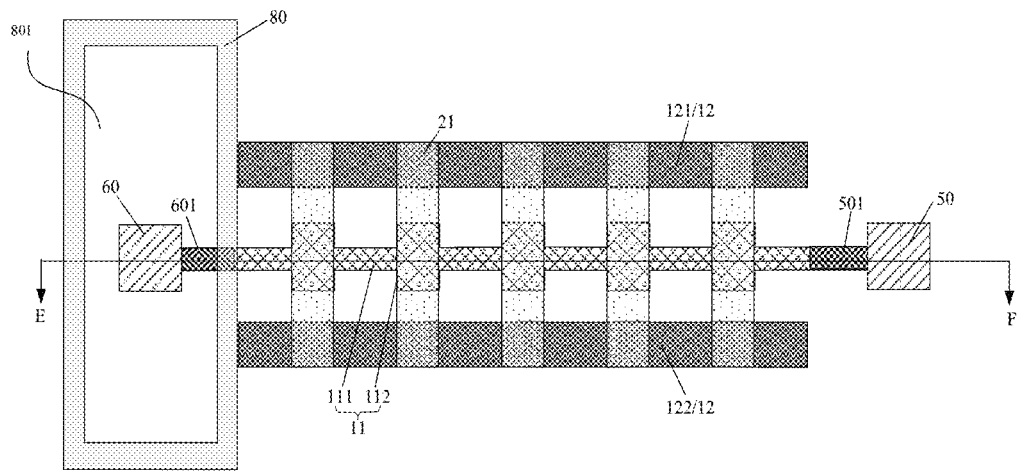
FIG. 2e is a top view of a phase shifter according to an embodiment of the present disclosure (a second waveguide structure).
Figure 2F:
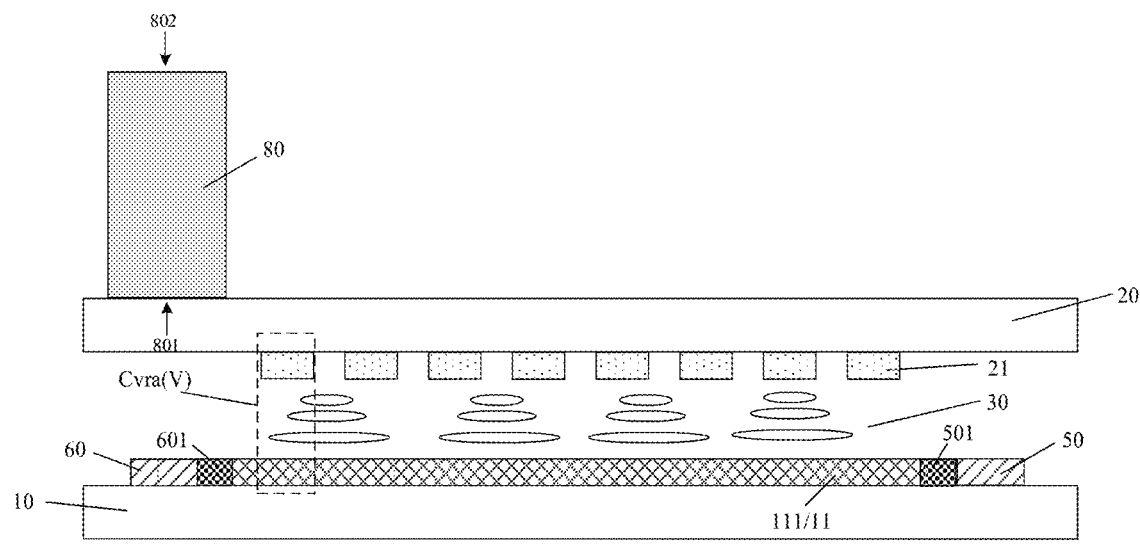
Figure 2G:
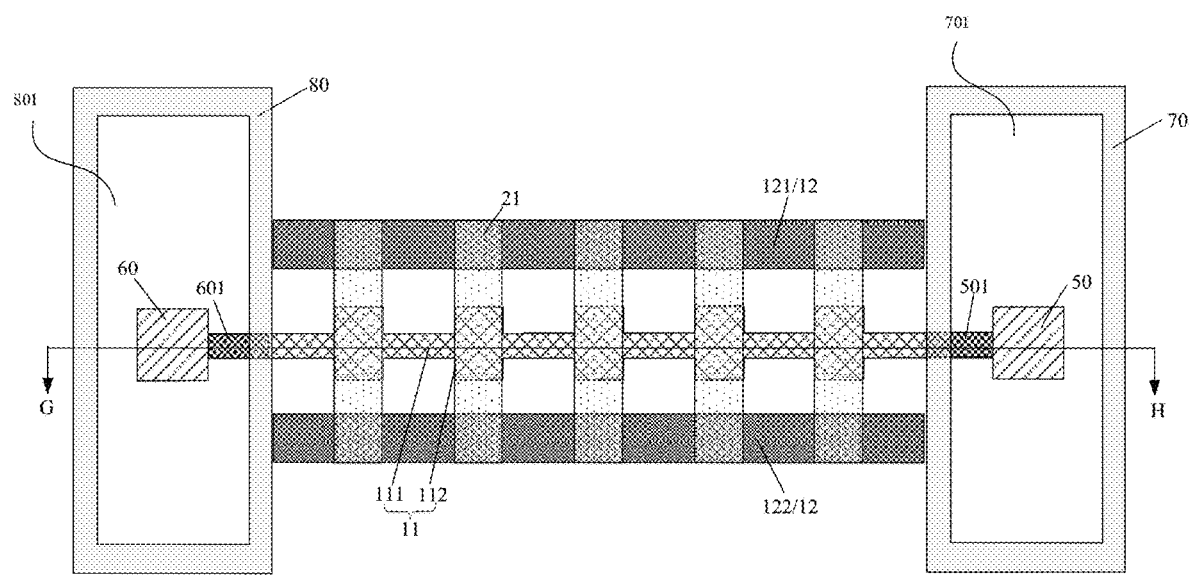
FIG. 2g is a top view of a phase shifter according to an embodiment of the present disclosure (a first waveguide structure and a second waveguide structure).
Figure 3:
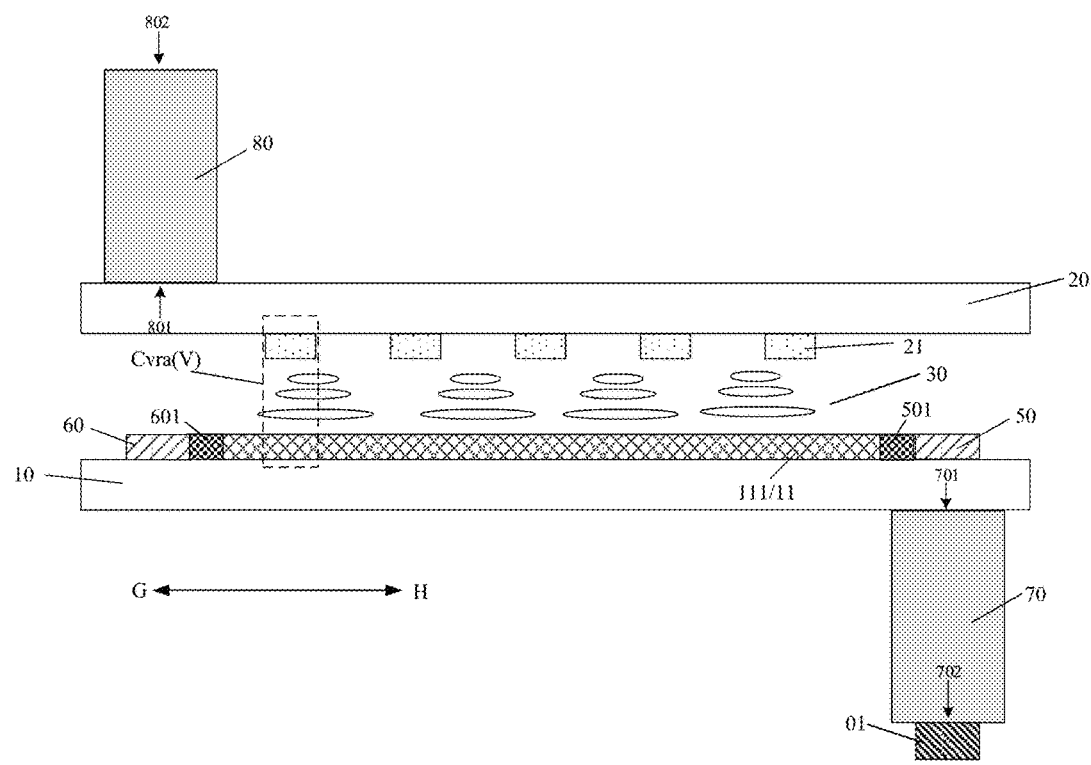
FIG. 3 is a cross-sectional view along a direction G-H in FIG. 2g.

In a first aspect, an embodiment of the present disclosure provides a phase shifter, referring to FIGS. 2a to 2g and 3. FIG. 2 is a top view of the phase shifter without a first base plate 10 and a second base plate 20 shown. FIG. 3 is a cross-sectional view taken along a direction G-H of the phase shifter shown in FIG. 2g. The phase shifter includes first and second substrates disposed oppositely to each other, and a dielectric layer 30 formed therebetween.

As an example, in the phase shifter adopting Coplanar Waveguide (CPW) transmission lines, the first substrate includes a first base plate 10, a reference electrode 12 and a signal line 11 disposed on a side of the first base plate 10 proximal to the dielectric layer 30, and the CPW transmission line is formed by the signal line 11 and the reference electrode 12; the signal line 11 may include a main structure 111 extending in the same direction as the reference electrode 12, and a plurality of branch structures 112 connected to the main structure 111 and spaced apart from each other, wherein at least one branch structure 112 is disposed along the extending direction of the main structure 111.

Figure 4:
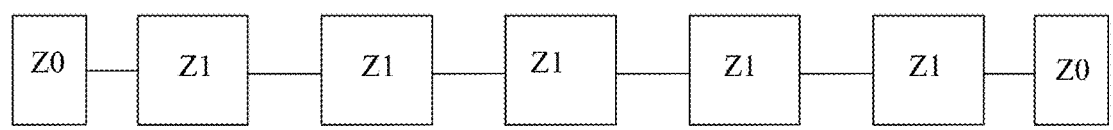
FIG. 4 is a diagram illustrating a change in impedance of the phase shifter of FIG. 2.

The second substrate includes a second base plate 20 and at least one patch electrode 21 disposed on a side of the second base plate 20 proximal to the dielectric layer 30, an extending direction of the patch electrode 21 is the same as that of the branch structure 112 of the signal line 11, the patch electrodes 21 and the branch structures 112 are disposed in a one-to-one correspondence, and orthographic projections of each patch electrode 21 and the corresponding branch structure 112 on the first base plate 10 are at least partially overlapped with each other. Also, in some examples, an orthographic projection of each patch electrode 21 on the first base plate 10 at least partially overlaps with an orthographic projection of the reference electrode 12 on the first base plate 10. The patch electrodes 21 and the branch structures 112 are disposed in a one-to-one correspondence. That is, one patch electrode 21 is disposed above one corresponding branch structure 112, the patch electrode 21 and the branch structure 112 are overlapped with each other to form a variable capacitor Cvra(V); at least one variable capacitor Cvra(V) is formed to be perpendicular to a transmission direction of an electromagnetic wave, so that parallel capacitors connected in parallel are formed. The phase shifter has an equivalent circuit model as shown in FIG. 1. The patch electrode 21 and the branch structure 112 have a certain overlap therebetween, so that when a microwave signal is input to the main structure 111, a certain voltage difference exists between voltages applied to the patch electrode 21 and the branch structure 112, so that a dielectric constant of the dielectric layer 30 changes in the variable capacitor Cvra(V) formed by the patch electrode 21 and the signal line 11 overlapping with each other, and thus a capacitance of the variable capacitor Cvra(V) changes and therefore a phase of the microwave signal is changed. In the phase shifter provided in this embodiment, overlapping areas for the formed variable capacitors Cvra(V) are the same, so that when the same voltage is applied to the patch electrodes 21, equivalent impedances of the formed variable capacitors Cvra(V) are also the same, as shown in FIG. 4, an impedance of each variable capacitor Cvra(V) is Z1. It should be noted herein that Z0 represents an impedance value formed between both ends for signal input (or output) of the signal line 11 and the reference electrode 12.

It should be noted that, the phase shifter may include a plurality of variable capacitors Cvra(V), or only include one variable capacitor Cvra(V). Accordingly, only one patch electrode 21 or a plurality of patch electrodes 21 may be disposed on a side of the second substrate 20 of the phase shifter proximal to the dielectric layer 30, which depends on a required phase shift degree. As an example, it will be described below that the phase shifter includes a plurality of patch electrodes 21, each of which is overlapped with one branch structure 112 to form a variable capacitor Cvra(V). That is, the phase shifter includes a plurality of variable capacitors Cvra(V), which is not limited the present disclosure.

It should be noted that, in the phase shifter, the reference electrode 12 may include only one sub-reference electrode, for example, only one of a first sub-reference electrode 121 and a second sub-reference electrode 122. The reference electrode 12 of the phase shifter may alternatively include the first sub-reference electrode 121 and the second sub-reference electrode 122. It will be described below by taking an example in which the reference electrode 12 includes the first sub-reference electrode 121 and the second sub-reference electrode 122, which is not limited in the present invention. If the reference electrode 12 includes the first sub-reference electrode 121 and the second sub-reference electrode 122, the signal line 11 is disposed between the first sub-reference electrode 121 and the second sub-reference electrode 122; an orthographic projection of each patch electrode 21 on a base plate at least partially overlaps with an orthographic projection of any one of its corresponding branch structure 112 and the first sub-reference electrode 121 and the second sub-reference electrode 122 on the base plate.

In the phase shifter, the signal line 11, the first reference electrode 121, and the second reference electrode 122 form CPW transmission lines; a signal is fed in from one of two ends of the signal line 11, and a signal is fed out of the other end; an electric field of the CPW transmission lines is a transverse electric field. That is, an electric field direction is directed from the signal line 11 to the first reference electrode 121 or the second reference electrode 122. A microwave signal is confined between the signal line 11 and the first reference electrode 121, and between the signal line 11 and the second reference electrode 122. At both ends of the signal line 11, the microwave signal needs to be fed in or out. In some examples, a microstrip line is directly connected across the signal line 11 for feeding, and may include a transmission electrode (not shown) disposed in the same layer as the signal line 11, and a third reference electrode (not shown) disposed on a side of the first base plate 10 opposite to the transmission electrode. Since the transmission electrode is connected across the signal line 11, the signal line 11 may be fed through the transmission electrode. However, an electric field formed between the transmission electrode and the third reference electrode of the microstrip line is a longitudinal electric field, that is, an electric field direction is directed from the transmission electrode to the third reference electrode and is approximately perpendicular to the first base plate 10, so that the transverse electric field on the signal line 11 of the CPW transmission lines cannot be directly converted into a longitudinal electric field on the microstrip line. Thus, a microwave signal cannot be directly transmitted from the signal line 11 to the transmission electrode well, resulting in a large transmission loss. In other embodiments, in order to convert the transverse 1 electric field at the two ends of the signal line 11 into the longitudinal electric field, the third reference electrode may be connected to the reference electrode 12 of the CPW transmission lines, which needs vias to be formed in the first base plate 10. The third reference electrode and the reference electrode 12 disposed at the two sides of the first base plate 10 are connected to each other through the vias in the first base plate 10. In this way, on one hand, the process complexity is increased, and on the other hand, if the first base plate 10 is a glass substrate, the vias cannot be formed in the glass substrate; and if a flowing medium such as liquid crystal molecules is used as the dielectric layer 30, the liquid crystal molecules may leak from the vias, thereby causing crystal leakage.

In order to solve the above problem, the embodiments of the present disclosure provide the following technical solutions. With continued reference to FIGS. 2a, 2b, FIG. 2B is a cross-sectional view taken along a line A-B in FIG. 2a. The phase shifter provided by the embodiment of the present disclosure further includes a first feeding structure 50 electrically connected to one end of the signal line 11 of the CPW transmission lines, and a second feeding structure 60 electrically connected to the other end. The first feeding structure 50 is configured to change a transmission direction of a microwave signal through the signal line 11 of the CPW transmission lines, so that the microwave signal through the signal line 11 is transmitted in a first direction, which intersects with a plane in which the first base plate 10 is located. The second feeding structure 60 is configured to change a transmission direction of the microwave signal through the signal line 11 of the CPW transmission line, so that the microwave signal through the signal line 11 is transmitted in a second direction, which intersects with the plane in which the first base plate 10 is located. Specifically, in the phase shifter, the first feeding structure 50 and the second feeding structure 60 are both feeding structures having a longitudinal electric field in a direction approximately perpendicular to the first base plate 10. That is, an electric field direction of an electric field generated by the first feeding structure 50 at least partially intersects the plane in which the first base plate 10 is located, and an electric field direction of an electric field generated by the second feeding structure 60 at least partially intersects the plane in which the first base plate 10 is located, so that the first feeding structure 50 and the second feeding structure 60 are connected at two ends of the signal line 11, which may convert the transverse electric field at two ends of the signal line 11 into the longitudinal electric field, so that the microwave signal is transmitted along the longitudinal electric field. As an example, the microwave signal is fed in from the first feeding structure 50, and is fed out of the second feeding structure 60, the microwave signal is coupled to the first feeding structure 50, the first feeding structure 50 transmits the received microwave signal to the signal line 11; and the microwave signal is transmitted along the extending direction of the signal line 11, and is transmitted to the second feeding structure 60 at the other end of the signal line 11 after being phase-shifted; the second feeding structure 60 couples the microwave signal to a side the second base plate 20 distal to the dielectric layer 30 under the longitudinal electric field. If a radiation unit is provided on the second base plate 20, the second feeding structure 60 may couple the microwave signals to the radiation unit, which in turn radiates the microwave signals. Since the first feeding structure 50 and the second feeding structure 60 are connected to the two ends of the signal line 11, the first feeding structure 50 and the second feeding structure 60 may convert the transverse electric field at the two ends of the signal line 11 into the longitudinal electric field, thereby realizing conversion of the transverse electric field at the two ends of the coplanar waveguide transmission lines into the longitudinal electric field.

It should be noted that, the first direction and the second direction both intersect the plane in which the first base plate 10 is located. That is, a transmission direction (the first direction) of the microwave signal changed by the first feeding structure 50 intersects the plane in which the first base plate 10 is located. Similarly, a transmission direction (the second direction) of the microwave signal changed by the electric field direction of the second feeding structure 60 intersects the plane in which the first base plate 10 is located. The first direction and the second direction may be any directions satisfying the above characteristics. For convenience of explanation, it will be described below by taking an example in which the first direction is a direction perpendicular to the plane in which the first base plate 10 is located, the second direction is a direction perpendicular to the plane in which the first base plate 10 is located and the first direction and the second direction are same, which does not limit the present disclosure.

It should be noted that, if the phase shifter is applied to an antenna which may be a transmitting antenna or a receiving antenna, the radiation unit is connected to the second feeding structure 60. If the antenna is used as the transmitting antenna, the first feeding structure 50 may receive a signal fed by a feed forward circuit, and then output the signal to the signal line 11, and the second feeding structure 60 receives the signal and then couples the signal to the radiation unit, and the radiation unit radiates the signal. If the antenna is used as the receiving antenna, the radiation unit receives a signal and then couples the signal to the second feeding structure 60, the second feeding structure 60 receives the signal and then transmits the signal to the signal line 11, and the first feeding structure 50 connected to the other end of the signal line 11 receives the signal and then couples the signal back to the feed forward circuit. For convenience of explanation, it will be described below by taking an example in which the first feeding structure 50 and the second feeding structure 80 of the phase shifter are used as input and output, respectively.

In some examples, the first and second feeding structures 50 and 60 may be any feeding structure capable of transmitting a microwave signal in a direction not parallel to the first base plate 10. For example, the first feeding structure 50 may be a monopole electrode, and the first feeding structure 50 and the signal line 11 may be disposed on the same layer and may be made of the same material. The second feeding structure 60 may also be a monopole electrode, and the second feeding structure 60 and the signal line 11 may be disposed on the same layer and may be made of the same material. Therefore, the monopole electrodes are connected to two ends of the signal line 11, such that the monopole electrodes may convert the transverse electric field of the signal line 11 of the CPW transmission lines into the longitudinal electric field, and radiate microwave signals toward a direction perpendicular to the first base plate 10, thereby achieving feeding in and feeding out of the microwave signal. The monopole electrodes as the first and/or second feeding structures 50 and 60 may include various types of specific structures. For example, each of the first and second feeding structures 50 and 60 may be a monopole patch electrode disposed on the same layer as the signal line 11. In some examples, the first and second feeding structures 50 and 60 may be integrally formed with the signal line 11, thereby simplifying the process. It will be described below by taking an example in which the first feeding structure 50 and the second feeding structure 60 are all monopole patch electrodes.

In some examples, if the first and second feeding structures 50 and 60 are monopole patch electrodes, a width of the first feeding structure 50 is greater than that of the signal line 11 of the CPW transmission lines, and a width of the second feeding structure 60 is also greater than that of the signal line 11 of the CPW transmission lines.

In some examples, in order to make the microwave signal transmission stable, the branch structure 112 may be disposed as penetrating the main structure 111 on the basis of the above structure. In some embodiments, the branch structure 112 may be integrally formed with the main structure 111. That is, as shown in FIG. 2a, the branch structure 112 and the main structure 111 are disposed on the same layer and made of the same material, thereby facilitating the preparation of the branch structure 112 and the main structure 111, and reducing the process cost. Alternatively, the branch structure 112 and the main structure 111 may be electrically connected together in any way, which is not limited by the embodiments of the present invention. At this time, when a microwave signal is input to the main structure 111, a certain voltage difference exists between the voltages applied to the patch electrode 21 and the branch structure 112, so that the dielectric constant of the dielectric layer 30 in a liquid crystal capacitor formed by overlapping the patch electrode 21 and the signal line 11 is changed, so as to change the phase of the microwave signal.

In some examples, referring to FIGS. 2C to 3, the phase shifter according to an embodiment of the present disclosure may employ a waveguide structure to receive/transmit signals from/to the first feeding structure 50 and/or the second feeding structure 60. Specific examples are explained below.

In some examples, see FIGS. 2c to 2d, where FIG. 2d is a cross-sectional view taken along a direction C-D of FIG. 2c. The phase shifter provided by the embodiment of the present disclosure may further include a first waveguide structure 70, which has a first port 701 and a second port 702, and is disposed corresponding to the first feeding structure 50. That is, an orthographic projection of the first feeding structure 50 on the first base plate 10 at least partially overlaps with an orthographic projection of the first port 701 of the first waveguide structure 70 on the first base plate 10. Specifically, the first waveguide structure 70 may be disposed on a side of the first base plate 10 distal to the dielectric layer 30, or may be disposed on a side of the second base plate 20 distal to the dielectric layer 30, as long as the orthogonal projection of the first feeding structure 50 on the first base plate 10 at least partially overlaps with the orthogonal projection of the first port 701 of the first waveguide structure 70 on the first base plate 10. In this embodiment, by taking an example in which the first feeding structure 50 is used as an input and the second feeding structure 60 is used as an output, the second port 702 of the first waveguide structure 70 receives a microwave signal transmitted by an external signal line; the microwave signal is coupled to the first feeding structure 50 overlapped with the first port 701 of the first waveguide structure 70 from the first port 701, through a waveguide cavity of the first waveguide structure 70; the first feeding structure 50 transmits the received microwave signal to the signal line 11; the microwave signal propagates along an extending direction of the signal line 11 and is transmitted to the second feeding structure 60 at the other end of the signal line 11 after being phase-shifted; the second feeding structure 60 couples the microwave signal through the longitudinal electric field. The transmission loss of the microwave signal may be effectively reduced by transmitting the signal through the first waveguide structure 60.

In some examples, see FIGS. 2e to 2f, where FIG. 2f is a cross-sectional view taken along a direction E-F of FIG. 2e. The phase shifter provided by the embodiment of the present disclosure may further include a second waveguide structure 80, which has a first port 801 and a second port 802, and is disposed corresponding to the second feeding structure 60. That is, an orthographic projection of the second feeding structure 60 on the first base plate 10 at least partially overlaps with an orthographic projection of the first port 801 of the second waveguide structure 80 on the first base plate 10. Specifically, the second waveguide structure 80 may be disposed on a side of the second base plate 20 distal to the dielectric layer 30, the second port 802 of the second waveguide structure 80 may be connected to the radiation unit. In this embodiment, by taking an example in which the first feeding structure 50 is used as an input and the second feeding structure 60 is used as an output, the first feeding structure 50 receives a microwave signal transmitted by an external signal line; the microwave signal propagates along the extending direction of the signal line 11 and is transmitted to the second feeding structure 60 at the other end of the signal line 11 after being phase-shifted; the second feeding structure 60 couples the microwave signal to the first port 801 of the second waveguide structure 80 overlapping with the second feeding structure 60 through the longitudinal electric field; the microwave signal is coupled to the radiation unit from the second port 802 of the second waveguide structure 80 through a waveguide cavity of the second waveguide structure 80. The transmission loss of the microwave signal may be effectively reduced by transmitting the signal through the second waveguide structure 80.

In some examples, see FIGS. 2g to 3, where FIG. 3 is a cross-sectional view taken along a direction G-H of FIG. 2g. The phase shifter provided by the embodiment of the present disclosure may be provided with waveguide structures at both the first feeding structure 50 and the second feeding structure 60. That is, the phase shifter may further include the first waveguide structure 70 and the second waveguide structure 80. The first feeding structure 50 and the second feeding structure 60 are respectively connected to both ends of the signal line 11; the first waveguide structure 70 has the first port 701 and the second port 702, and is disposed corresponding to the first feeding structure 50. That is, the orthographic projection of the first feeding structure 50 on the first base plate 10 at least partially overlaps with the orthographic projection of the first port 701 of the first waveguide structure 70 on the first base plate 10; the second waveguide structure 80 has the first port 801 and the second port 802, and is disposed corresponding to the second feeding structure 60. That is, the orthographic projection of the second feeding structure 60 on the first base plate 10 at least partially overlaps with the orthographic projection of the first port 801 of the second waveguide structure 80 on the first base plate 10.

In the phase shifter, the first feeding structure 50 and the second feeding structure 60 are both feeding structures having the longitudinal electric field in the direction approximately perpendicular to the first base plate 10, and therefore, the first feeding structure 50 and the second feeding structure 60 are connected to both ends of the signal line 11, which may convert the transverse electric field at both ends of the signal line 11 into the longitudinal electric field; by taking an example in which a microwave signal is fed in from the first feeding structure 50 and fed out of the second feeding structure 60, the microwave signal is fed into the waveguide cavity of the first waveguide structure 70 via the second port 702 of the first waveguide structure 70; and then coupled to the first feeding structure 50 overlapped with the first port 701 of the first waveguide structure 70 via the first port 701; the first feeding structure 50 transmits the received microwave signal to the signal line 11; the microwave signal propagates along the extending direction of the signal line 11, and is transmitted to the second feeding structure 60 at the other end of the signal line 11 after being phase-shifted; the second feeding structure 60 couples the microwave signal to the first port 801 of the second waveguide structure 80 overlapped with the second feeding structure 60 through the longitudinal electric field; and then the microwave signal is fed out via the second port 802 of the second waveguide structure 80. Because the first feeding structure 50 and the second feeding structure 60 are used to be connected to two ends of the signal line 11, the first feeding structure 50 and the second feeding structure 60 may convert the transverse electric fields at two ends of the signal line 11 into the longitudinal electric field, thereby realizing the conversion from the transverse electric field at two ends of the coplanar waveguide transmission line to the longitudinal electric field; and the first waveguide structure 70 and the second waveguide structure 80 are used to transmit microwave signals, so that the transmission loss of the microwave signals may be effectively reduced.

It should be noted that, in the phase shifter provided in the embodiment of the present disclosure, the phase shifter may be provided with only the first waveguide structure 70, only the second waveguide structure 80, or both the first waveguide structure 70 and the second waveguide structure 80, which is not limited herein. It will be described below by taking an example in which the first waveguide structure 70 and the second waveguide structure 80 are disposed in the phase shifter.

In the phase shifter provided in the embodiments of the present disclosure, the dielectric layer 30 may be a tunable dielectric of various types. For example, the dielectric layer 30 may include a tunable dielectric such as liquid crystal molecules or ferroelectrics. It will be described below by taking an example in which the dielectric layer 30 includes liquid crystal molecules. By applying voltages to the patch electrodes 21 and the CPW transmission lines, a rotation angle of the liquid crystal molecules may be changed, so that the dielectric constant of the liquid crystal layer 30 is changed, and the phase shift is achieved.

In some examples, the liquid crystal molecules in the dielectric layer 30 are positive liquid crystal molecules or negative liquid crystal molecules. It should be noted that, when the liquid crystal molecules are positive liquid crystal molecules, in the embodiment of the present disclosure, an included angle between a long axis direction of the liquid crystal molecule and the patch electrode 21 is greater than 0 degree and less than or equal to 45 degrees. When the liquid crystal molecules are negative liquid crystal molecules, in the embodiment of the present disclosure, the included angle between the long axis direction of the liquid crystal molecule and the patch electrode 21 is larger than 45 degrees and smaller than 90 degrees, so that the dielectric constant of the dielectric layer 30 is changed after the liquid crystal molecules are rotated, and the phase shift is achieved.

In some examples, the phase shifter provided in the embodiments of the present disclosure further includes a signal connector 01 having one end connected to an external signal line, and the other end connected to the second port 702 of the first waveguide structure 70, to input a microwave signal to the first waveguide structure 70. The first waveguide structure 70 couples the microwave signal to the first feeding structure 50. The signal connector 01 may be various types of connectors, such as an SMA connector, and the like, which is not limited thereto.

It should be noted that, in the phase shifter provided in the embodiment of the present disclosure, the microwave signal may be a high-frequency signal, and a control signal periodically applied to the parallel capacitors may be a low-frequency signal, so that the control signal for transmitting the microwave signal is different from the control signal applied to the capacitors, the microwave signal is input to the signal line 11 through the first feeding structure 50 or the second feeding structure 60, and the control signal applied to the capacitor is input to the patch electrode 21 and the signal line 11 through a signal line.

In some examples, the phase shifter provided by the embodiment of the present disclosure may further include a first signal line and a second signal line (neither of which is shown in the figure). The first signal line is used for periodically applying a control signal for the parallel capacitors to the patch electrodes 21, and is electrically connected to the patch electrodes 21. The second signal line is used for periodically applying a control signal for the parallel capacitors to the signal line 11, and is electrically connected to the signal line 11.

In addition, it should be noted that, the phase shifter may include a plurality of phase adjusting units, each of which corresponds to one or more patch electrodes 21. A voltage is applied to each phase adjusting unit and the signal line 11 of the CPW transmission lines to form an electric field therebetween, which drives the liquid crystal molecules of the dielectric layer 30 to rotate, changing the dielectric constant of the dielectric layer 30, so that the phase of the microwave signal may be changed. A voltage is applied to the patch electrodes 21 in different phase adjusting units and the signal line 11, the phase shift amounts adjusted correspondingly are different from each other. That is, each phase adjusting unit has a phase shift amount adjusted correspondingly, so that when the phase shift amount may be required to be adjusted, the corresponding phase adjusting unit is controlled, according to the phase shift amount to be adjusted, to apply a voltage. It is unnecessary to apply a voltage to all the phase adjusting units, so that the phase shifter in the embodiment is easily controlled and has a low power consumption.

In addition, for convenience of control and simplicity of wiring, the patch electrodes 21 in each phase adjusting unit may be controlled using the same first signal line. Alternatively, the respective patch electrode 21 in different phase adjusting units may be controlled by using different first signal lines according to actual requirements, which is not limited herein.

In some examples, referring to FIG. 2g, in order to ensure that the first feeding structure 50 may better perform transmission of microwave signals with the first waveguide structure 70, the orthographic projection of the first feeding structure 50 on the first base plate 10 is located in the orthographic projection of the first port 701 of the first waveguide structure 70 on the first base plate 10; likewise, in order to ensure that the second feeding structure 60 may better perform transmission of microwave signals with the second waveguide structure 80, the orthographic projection of the second feeding structure 60 on the first base plate 10 is located in the orthographic projection of the first port 801 of the second waveguide structure 80 on the first base plate 10.

Further, in order to ensure the transmission efficiency of the first feeding structure 50 and the first waveguide structure 70, the feeding structure 50 and the first waveguide structure 70 may be arranged opposite to each other; a shape of the first feeding structure 50 may be a centrosymmetric pattern; a shape of the first port 701 of the first waveguide structure 70 may be a centrosymmetric pattern; a distance between an orthographic projection of a symmetry center of the first feeding structure 50 on the first base plate 10 and an orthographic projection of a c symmetry enter of the first port 701 of the first waveguide structure 70 on the first base plate 10 are not greater than a first preset value; the first preset value should be as small as possible, for example, smaller than 0.1 cm; if the first preset value is 0, the first feeding structure 50 and the first waveguide structure 70 are arranged completely opposite to each other, and the centers of symmetry of the first feeding structure 50 and the first waveguide structure 70 coincide with each other. Similarly, in order to ensure the transmission efficiency of the second feeding structure 60 and the second waveguide structure 80, the second feeding structure 60 and the second waveguide structure 80 may be arranged opposite to each other; a shape of the second feeding structure 60 may be a centrosymmetric pattern; and a shape of the first port 801 of the second waveguide structure 80 may be a centrosymmetric pattern. A distance between an orthographic projection of a symmetry center of the second feeding structure 60 on the first base plate 10 and an orthographic projection of a symmetry center of the first port 801 of the second waveguide structure 80 on the first base plate 10 are not greater than a first preset value; the first preset value should be as small as possible, for example, smaller than 0.1 cm; if the first preset value is 0, the second feeding structure 60 and the second waveguide structure 80 are arranged completely opposite to each other, and the centers of symmetry of the second feeding structure 60 and the second waveguide structure 80 coincide with each other.

Figure 5:
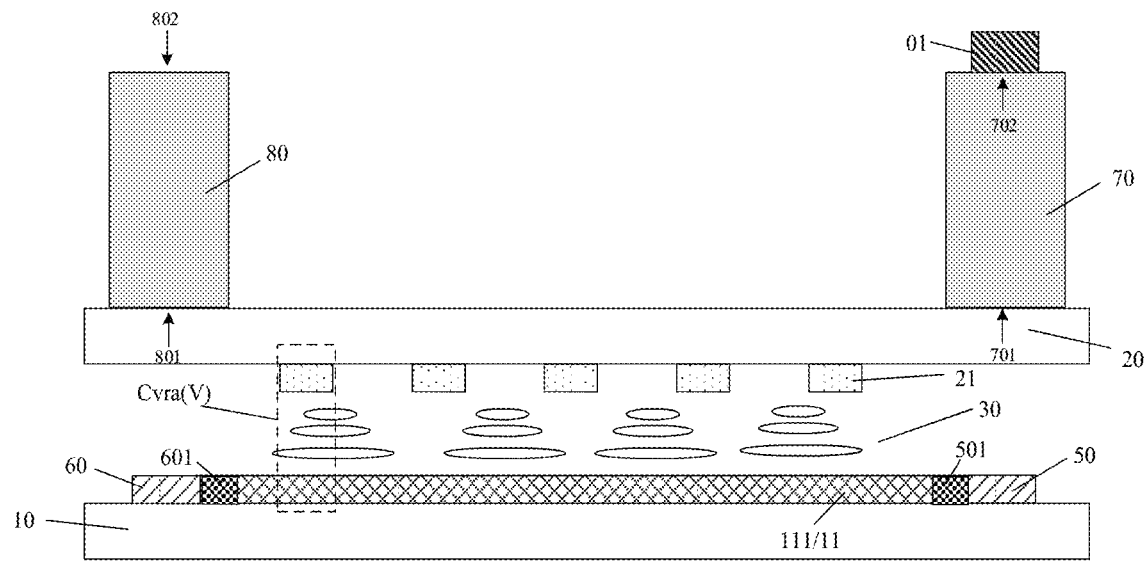
FIG. 5 is a side view of a phase shifter according to an embodiment of the present disclosure.

In some examples, referring to FIGS. 3 and 5, the first waveguide structure 70 is disposed corresponding to the first feeding structure 50, and the second waveguide structure 80 is disposed corresponding to the second feeding structure 60. Specifically, as shown in FIG. 3, the first waveguide structure 70 and the second waveguide structure 80 may be disposed on opposite sides. That is, the first waveguide structure 70 is disposed on a side of the first base plate 10 distal to the dielectric layer 30, and the second waveguide structure 80 is disposed on a side of the second base plate 20 distal to the dielectric layer. It is understood that, as shown in FIG. 5, the first waveguide structure 70 and the second waveguide structure 80 may be disposed on the same side, for example, both disposed on the side of the second base plate 20 distal to the dielectric layer 30. In this case, an orthographic projection of the first waveguide structure 70 on the second base plate 20 does not overlap with an orthographic projection of the second waveguide structure 80 on the second base plate 20, so as to ensure that the first waveguide structure 70 and the second waveguide structure 80 are independent from each other and do not affect each other.

Figure 6:
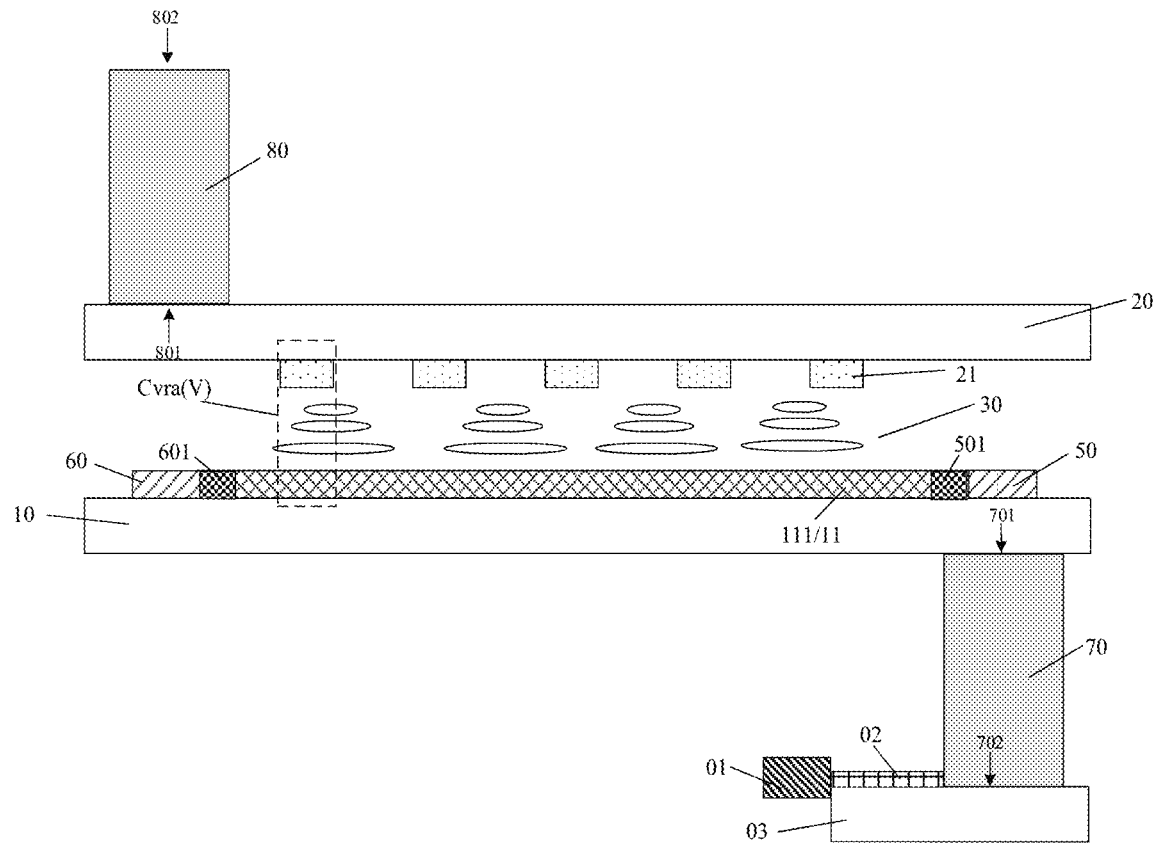
FIG. 6 is a side view of a phase shifter according to an embodiment of the present disclosure.
Figure 7:
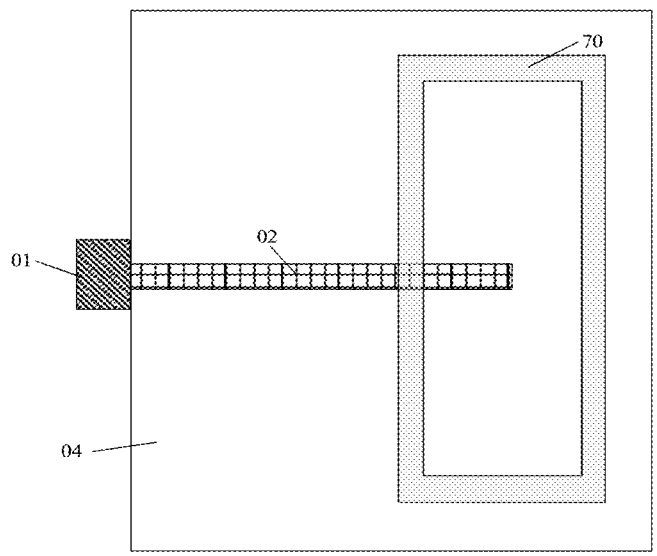
FIG. 7 is a top view of the third substrate of FIG. 6.

In some examples, referring to FIGS. 6, 7, the phase shifter may further include a third substrate connected to the second port 702 of the first waveguide structure 70. The third substrate includes a third base plate 03 and a feeding transmission line 02; the third base plate 03 is connected to the second port 702 of the first waveguide structure 70; and the feeding transmission line 02 is disposed on a side of the third base plate 03 proximal to the first waveguide structure 70. Referring to FIG. 7, a first end of the feeding transmission line 02 extends to an edge of the third base plate 03 to be connected to an external signal line. Specifically, the signal connector 01 may be disposed on the edge of the third base plate 03, have an end connected to the feeding transmission line 02, and the other end connected to the external signal line, for inputting a signal to the feeding transmission line 02. A second end of the feeding transmission line 02 extends to the second port 702 of the first waveguide structure 70 to feed the signal into the waveguide cavity of the first waveguide structure 70, and the first waveguide structure 70 couples the signal to the first feeding structure 50 through the first port 701 of the first waveguide structure 70. In particular, the second end of the feeding transmission line 02 may extend into the second port 702 of the first waveguide structure 70. That is, an orthogonal projection of the second end of the feeding transmission line 02 on the first base plate 10 is located in an orthogonal projection of the second port 702 of the first waveguide structure 70 on the first base plate 10.

In some examples, referring to FIG. 2g, the CPW transmission lines may not extend into the waveguide cavities of the first waveguide structure 70 and/or the second waveguide structure 80, or a small part of the CPW transmission lines may extend into the waveguide cavities of the first waveguide structure 70 and/or the second waveguide structure 80. If the CPW transmission lines do not extend into the waveguide cavities of the first waveguide structure 70 and/or the second waveguide structure 80, an orthogonal projection of the signal line 11 of the CPW transmission lines on the first base plate 10 does not overlap with an orthogonal projection of the first port 701 of the first waveguide structure 70 and the first port 801 of the second waveguide structure 80 on the first base plate 10. Similarly, orthogonal projections of the first sub-reference electrode 121 and the second sub-reference electrode 122 on the first base plate 10 do not overlap with the orthogonal projections of the first port 701 of the first waveguide structure 70 and the first port 801 of the second waveguide structure 80 on the first base plate 10.

In some examples, the phase shifter may further include a first connection structure 501 and a second connection structure 601 disposed on a side of the first base plate 10 proximal to the dielectric layer 30. The first connection structure 501 is connected between the first feeding structure 50 and a first end of the main structure 111 of the signal line 11, and the second connection structure 601 is connected between the second feeding structure 60 and a second end of the main structure 111 of the signal line 11. The first connection structure 501 and the second connection structure 601 may be used as impedance matching structures. At a position at which the first feeding structure 50 and the signal line 11 are in contact with each other at the input for the microwave signal, if impedances of the first feeding structure and the signal line are different, a standing wave ratio (standing wave) is not 1. That is, a return loss exists, so that performance is degraded. Therefore, impedance matching needs to be considered. Specifically, the first connection structure 501 is provided so that the impedance matching is performed between the first feeding structure 50 and the signal line 11 (impedances of the first feeding structure 50 and the signal line 11 match with each other). Similarly, at a position at which the second feeding structure 60 and the signal line 11 of the CPW transmission lines are in contact with each other at a load (e.g., radiation unit) end, if impedances of the second feeding structure 60 and the signal line 11 are different, a standing wave ratio (standing wave) is not 1. That is, a return loss exists, so that performance is degraded. Therefore, impedance matching needs to be considered. Specifically, the second connection structure 601 is provided so that the impedance matching is performed between the second feeding structure 60 and the signal line 11 (impedances of the second feeding structure 60 and the signal line 11 match with each other).

In some examples, if the impedances of the first feeding structure 50, the second feeding structure 60, and the signal line 11 are the same, for example, all are 100Ω, impedance matching is not required. The first connection structure 501 and the second connection structure 601 may be connection lines; a width of the first connection structure 501 may be the same as a width of the main structure 111 of the signal line 11; and a width of the second connection structure 601 may be the same as the width of the main structure 111 of the signal line 11. In the present embodiment, it will be described below by taking an example in which the first connection structure 501, the second connection structure 601, and the signal line 11 all have the same width. In some examples, the first and second connection structures 501 and 601 may be integrally formed with the signal line 11 to simplify the process.

It should be noted that the first connection structure 501 or the second connection structure 601 is connected to the main structure 111 of the signal line 11 of the CPW transmission lines, and gaps are reserved between the first connection structure 501 or the second connection structure 601 and the first sub-reference electrode 121 and between the first connection structure 501 or the second connection structure 601 and the second sub-reference electrode 122.

Figure 8:
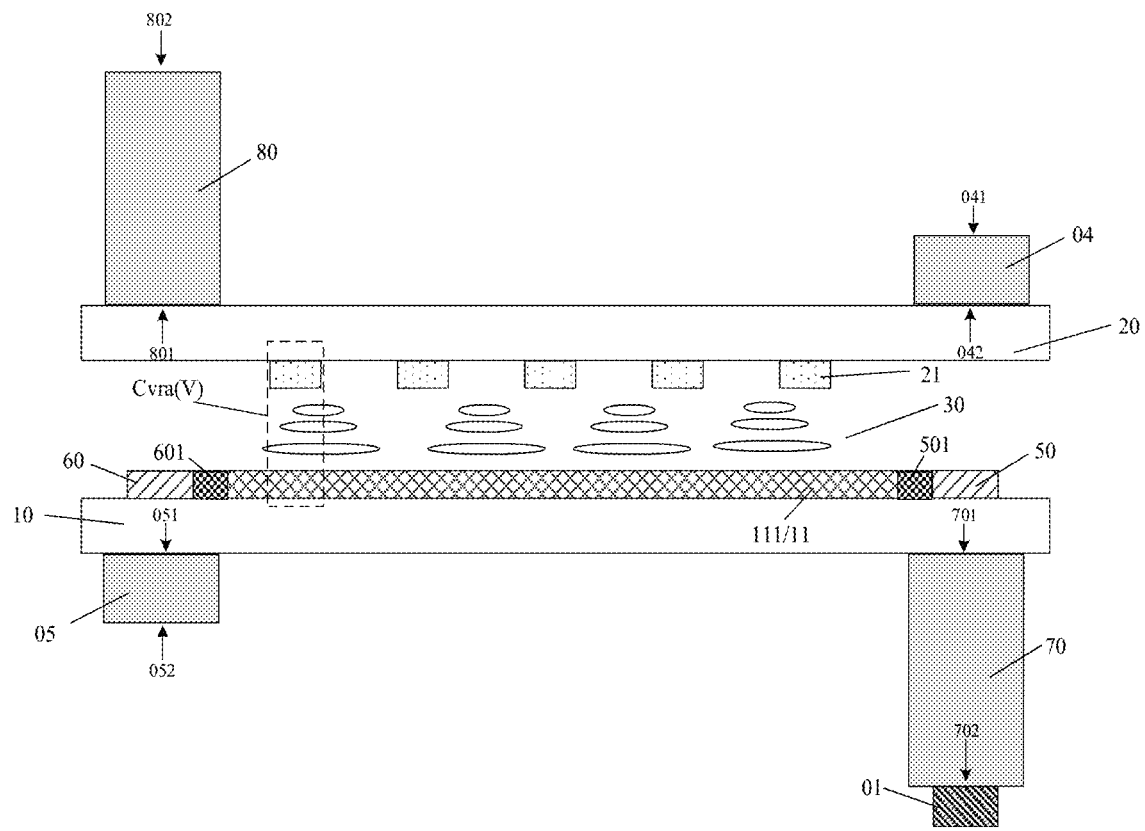
FIG. 8 is a side view of a phase shifter according to an embodiment of the present disclosure (with a first waveguide structure and a second waveguide structure disposed on opposite sides).
Figure 9:
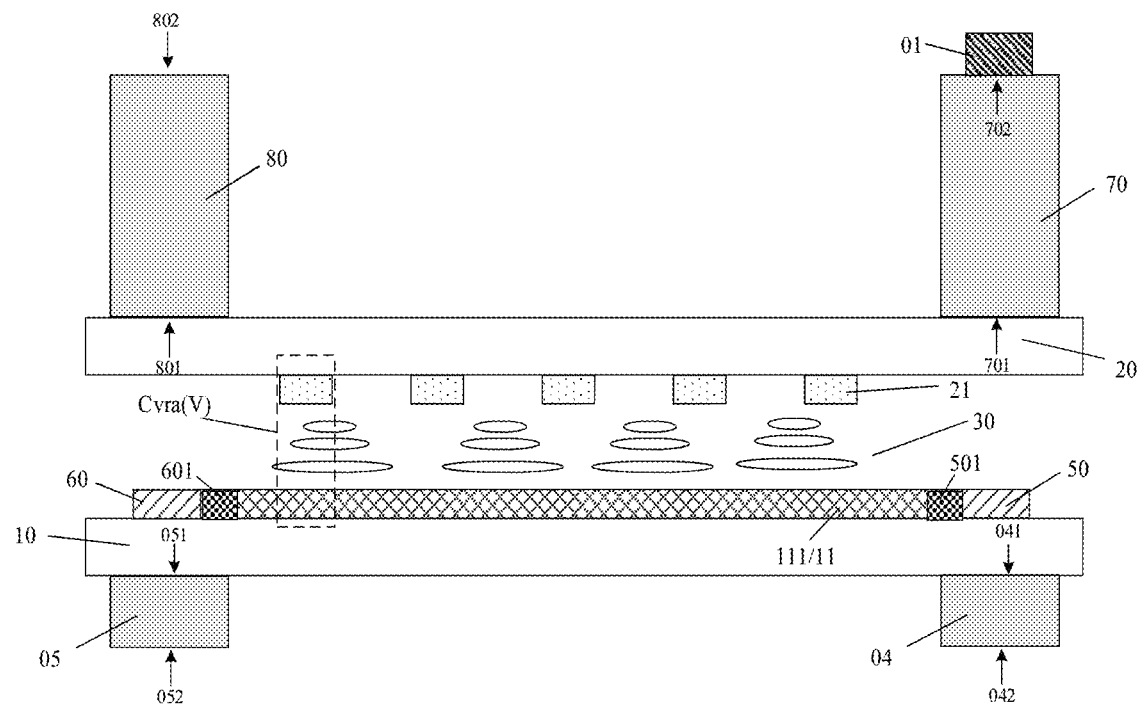
FIG. 9 is a side view of a phase shifter according to an embodiment of the present disclosure (with a first waveguide structure and a second waveguide structure disposed on the same side).

In some examples, referring to FIGS. 8, 9, the phase shifter may further include a first reflective structure 04 and a second reflective structure 05. The first reflective structure 04 is disposed on a side of the first feeding structure 50 distal to the first waveguide structure 70; an orthographic projection of the first reflective structure 04 on the first base plate 10 at least partially overlaps with the orthographic projection of the first port 701 of the first waveguide structure 70 on the first base plate 10, and at least partially overlaps with the orthographic projection of the first feeding structure 50 on the first base plate 10. Since the electric field of the first feeding structure 50 is the longitudinal electric field, microwave signals are radiated from both sides of the first feeding structure 50 in a longitudinal direction, signals toward the first waveguide structure 70 are coupled into the first waveguide structure 70, and microwave signals radiated from the first feeding structure 50 toward a side distal to the first waveguide structure 70 are reflected back into the first waveguide structure 70 by the first reflective structure 04, thereby effectively increasing radiation efficiency. Similarly, the second reflective structure 05 is disposed on a side of the second feeding structure 60 distal to the second waveguide structure 80, an orthographic projection of the second reflective structure 05 on the second base plate 20 at least partially overlaps with an orthographic projection of the first port 801 of the second waveguide structure 80 on the second base plate 20, and at least partially overlaps with an orthographic projection of the second feeding structure 60 on the second base plate 20. Since the electric field of the second feeding structure 60 is the longitudinal electric field, microwave signals are radiated from both sides of the second feeding structure 60 in a longitudinal direction, a signal toward the second waveguide structure 80 is coupled into the second waveguide structure 80, and a microwave signal radiated from the second feeding structure 60 towards the side distal to the second waveguide structure 80 is reflected back into the second waveguide structure 80 by the second reflective structure 05, thereby effectively increasing radiation efficiency.

Specifically, in a case where the first waveguide structure 70 and the second waveguide structure 80 are disposed on different sides, if the first waveguide structure 70 is disposed on a side of the first base plate 10 distal to the dielectric layer 30, the first reflective structure 04 is disposed on a side of the second base plate 20 distal to the dielectric layer 30; if the second waveguide structure 80 is disposed on a side of the second base plate 20 distal to the dielectric layer 30, the second reflective structure 05 is disposed on a side of the first base plate 20 distal to the dielectric layer 30. If the first waveguide structure 70 and the second waveguide structure 80 are disposed on the same side, for example, on the side of the second base plate 20 distal to the dielectric layer 30, the first reflective structure 04 and the second reflective structure 05 are disposed on the side of the first base plate 10 distal to the dielectric layer 30.

In some examples, the first reflective structure 04 may be a waveguide structure; a waveguide cavity of the first reflective structure 04 has a first port 041 and a second port 042; and the first port 041 of the first reflective structure 04 is opposite to the first port 701 of the first waveguide structure 70, so that an orthographic projection of the first port 041 of the first reflective structure 04 on the first base plate 10 at least partially or completely overlaps with the orthographic projection of the first port 701 of the first waveguide structure 70 on the first base plate 10. The second reflective structure 05 may also be a waveguide structure; a waveguide cavity of the second reflective structure 05 has a first port 051 and a second port 052; the first port 051 of the second reflective structure 05 is opposite to the first port 801 of the second waveguide structure 80, so that an orthographic projection of the first port 051 of the second reflective structure 05 on the second base plate 20 at least partially or completely overlaps with an orthographic projection of the first port 801 of the second waveguide structure 80 on the second base plate 20.

Figure 10:
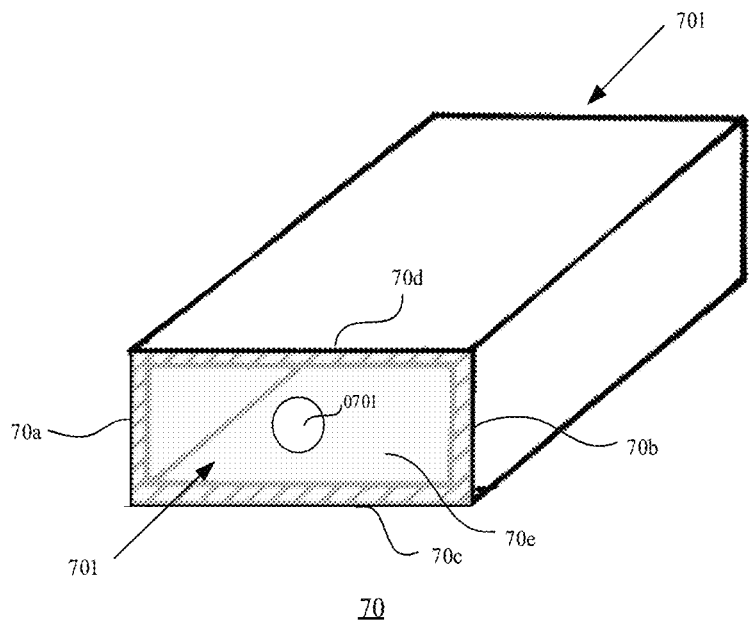
FIG. 10 is a partial schematic diagram of a first waveguide structure in a phase shifter according to an embodiment of the present disclosure.

In some examples, the first waveguide structure 70 and the second waveguide structure 80 may be formed by using hollow metal walls. In particular, the first waveguide structure 70 may have at least one first sidewall that forms the waveguide cavity of the first waveguide structure 70, and/or the second waveguide structure 80 may have at least one second sidewall that forms the waveguide cavity of the second waveguide structure 80. If the first waveguide structure 70 has only one first sidewall, the first waveguide structure 70 is a circular waveguide structure, and the first sidewall encloses a circular hollow pipe to form the waveguide cavity of the first waveguide structure 70. The first waveguide structure 70 may alternatively include a plurality of first sidewalls to form the waveguide cavity with various shapes. For example, referring to FIG. 10, the first waveguide structure 70 may include four first sidewalls 70a to 70d; the first sidewall 70a is disposed opposite to the first sidewall 70b; the first sidewall 70c is disposed opposite to the first sidewall 70d; and the four first sidewalls 70a to 70d are connected to each other to form a rectangular waveguide cavity, so that the first waveguide structure 70 is a rectangular waveguide. It should be noted that, at the second port 702 of the first waveguide structure 70, a bottom surface 70e may be included, cover the whole second port 702, have an opening 0701 which matches with one end of the signal connector 01; the signal connector 01 is inserted into the first waveguide structure 70 through the opening 0701; and the other end of the signal connector 01 is connected to an external signal line to input a signal into the first waveguide structure 70. The structure of the second waveguide structure 80 is the same as that of the first waveguide structure 70. If the second waveguide structure 80 has only one second sidewall, the second waveguide structure 80 is a circular waveguide structure; if the second waveguide structure 80 includes a plurality of second sidewalls, the plurality of second sidewalls form the second waveguide structure 80 having a corresponding shape. It will be described below by taking an example in which the first waveguide structure 70 and the second waveguide structure 80 are rectangular waveguides, which is not limited thereto.

It should be noted that a thickness of the first sidewall of the first waveguide structure 70 may be 4 to 6 times a skin depth of the microwave signal transmitted by the phase shifter; a thickness of the second sidewall of the second waveguide structure 80 may be 4 to 6 times the skin depth of the microwave signal transmitted by the phase shifter, which is not limited herein.

Figure 11:
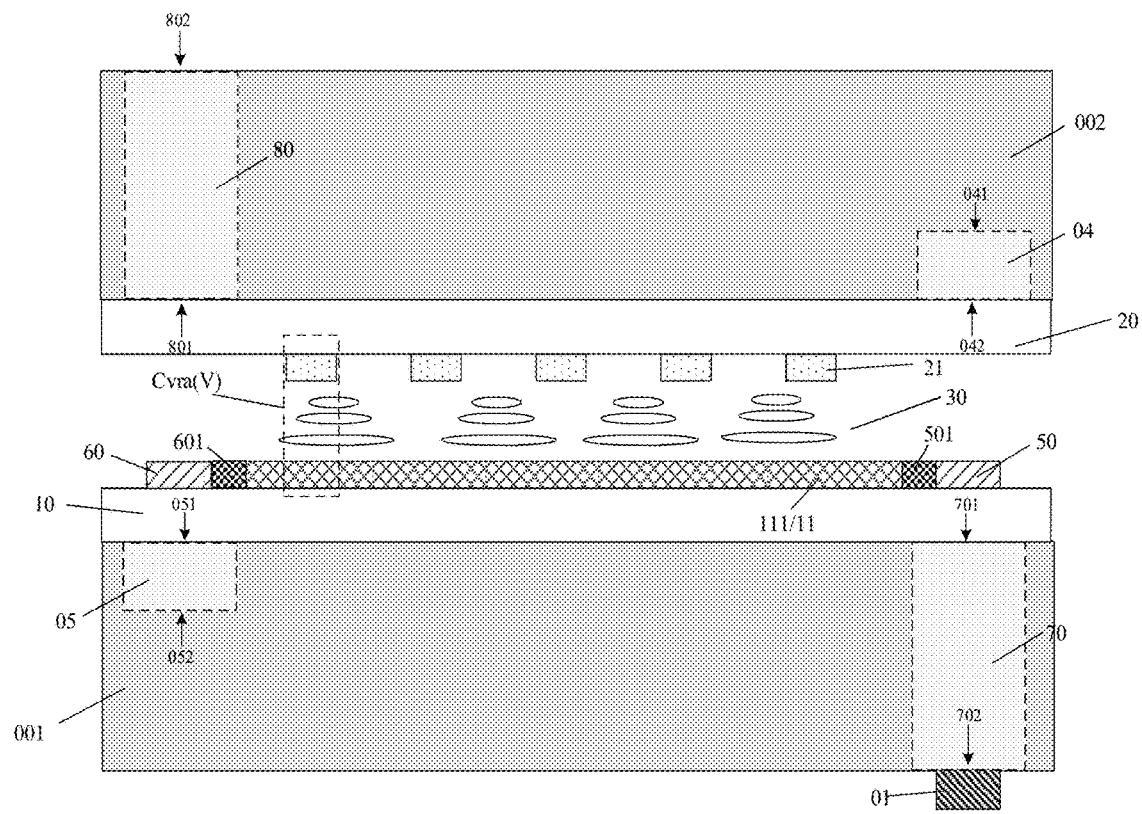
FIG. 11 is a side view of a phase shifter according to an embodiment of the present disclosure (a first waveguide structure and a second waveguide structure disposed on opposite sides and being cavities).
Figure 12:
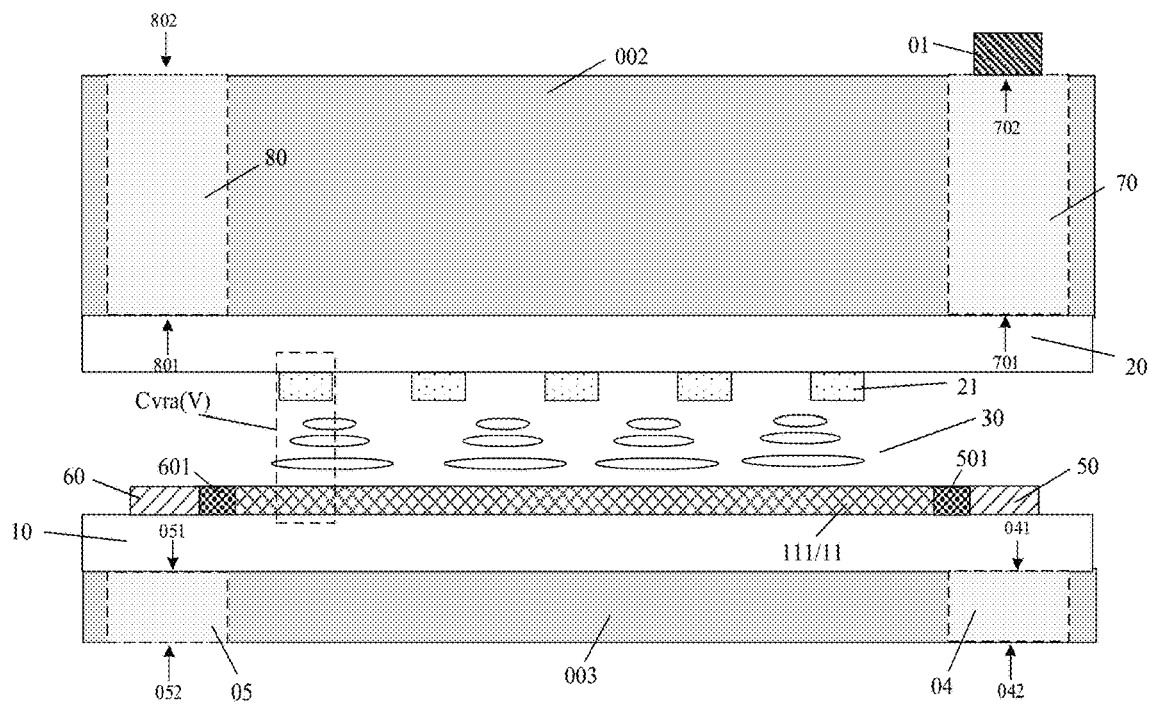
FIG. 12 is a side view of a phase shifter according to an embodiment of the present disclosure (a first waveguide structure and a second waveguide structure disposed on the same side and being cavities).

In some examples, the first waveguide structure 70 and the second waveguide structure 80 may be formed by cavities in a metal block. Specifically, referring to FIG. 11, if the first waveguide structure 70 and the second waveguide structures 80 are disposed on different sides, the phase shifter may further include a first metal layer 001 and a second metal layer 002, wherein the first metal layer 001 is disposed on a side of the first base plate 10 distal to the dielectric layer 30, and has a hollow first cavity; a shape of the first cavity is like the shape of the first waveguide structure 70, so as to define the first waveguide structure 70; the first cavity penetrates through the entire first metal layer 001; an opening close to the first base plate 10 serves as the first port 701 of the first waveguide structure 70 which is connected to the side of the first base plate 10 distal to the dielectric layer 30; an opening at a side of the first cavity distal to the first base plate 10 serves as the second port 702 of the first waveguide structure 70 which is connected to the signal connector 01. Similarly, the second metal layer 002 is disposed on the side of the second base plate 20 distal to the dielectric layer 30, and has a hollow second cavity; a shape of the second cavity is like the shape of the second waveguide structure 80, so as to define the second waveguide structure 80; the second cavity penetrates through the entire second metal layer 002; an opening close to the second base plate 20 serves as the first port 801 of the second waveguide structure 80 which is connected to the side of the second base plate 10 distal to the dielectric layer 30; an opening at a side of the second cavity distal to the second base plate 20 serves as the second port 802 of the second waveguide structure 80 which is connected to the load (for example, an antenna). If the phase shifter has the first reflective structure 04 and the second reflective structure 05, the second metal layer 002 further has a third cavity to define the first reflective structure 04, and the first metal layer 001 further has a fourth cavity to define the second reflective structure 05. Referring to FIG. 12, if the first waveguide structure 70 and the second waveguide structure 80 are formed on the same side, the phase shifter may only include the second metal layer 002 disposed on the side of the second base plate 20 distal to the dielectric layer 30; the second metal layer 002 has a first cavity and a second cavity; the first cavity is like the shape of the first waveguide structure 70 to define the first waveguide structure 70, and the second cavity is like the shape of the second waveguide structure 80 to define the second waveguide structure 80. In this way, an orthographic projection of the first cavity on the second base plate 20 is not overlapped with an orthographic projection of the second cavity on the second base plate 20, so as to ensure that the waveguide cavities of the first waveguide structure 70 and the second waveguide structure 80 are independent from each other and do not affect each other. If the phase shifter has the first reflective structure 04 and the second reflective structure 05, a third metal layer 003 may be disposed on a side of the first base plate 10 distal to the dielectric layer 30, and has a third cavity and a fourth cavity, wherein the third cavity defines the first reflective structure 04, and the fourth cavity defines the second reflective structure 05. Since a length of each of the first and second reflective structures 04 and 05 are smaller than a length of each of the first and second waveguide structures 70 and 80, a thickness of the first metal layer 003 is also smaller than that of the second metal layer 002.

In the phase shifter provided in the embodiment of the present disclosure, in order to apply the structure where CPW is periodically loaded with the variable capacitors Cvra(V) to a phased array antenna, and implement the function of beam scanning, it is required that an adjustable range of phase difference of each phase shifter is necessarily greater than 360°. In order to achieve this value, the phase shifters are placed and reasonably arranged in a limited area, which is required that the overall length of the phase shifters is not too long. Therefore, a value of the variable capacitor Cvra(V) in each cycle (period) must be sufficiently large, so as to implement the phase difference within the limited length. If the variable capacitor Cvra(V) has a large variation value, an impedance of the equivalent transmission line has a large variation value, which will cause a serious problem of the deterioration of the port performance and the increase of the transmission loss.

Figure 13:
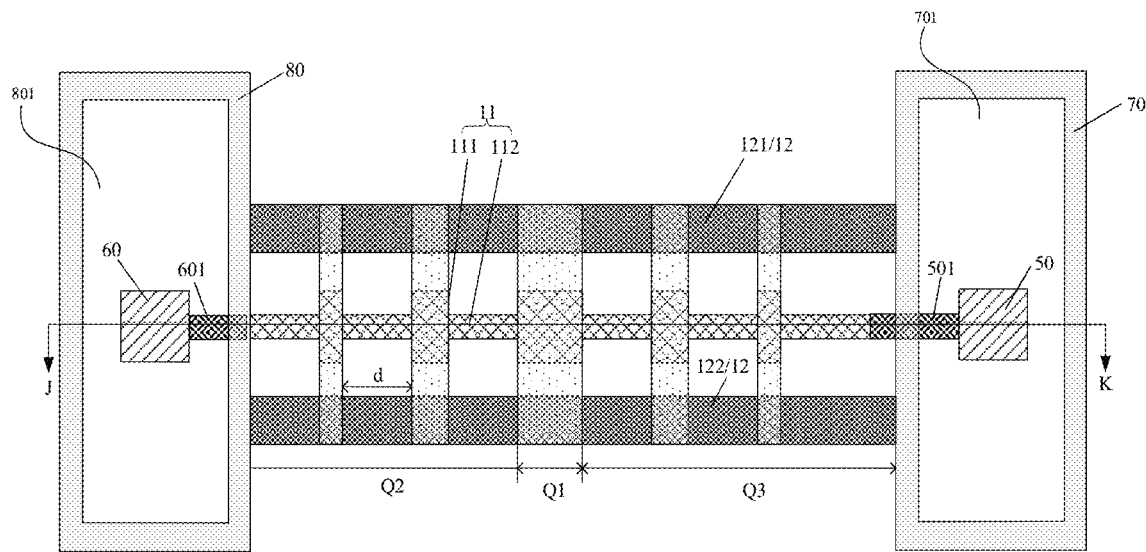
FIG. 13 is a side view of a phase shifter according to an embodiment of the present disclosure (overlapping areas being different from each other).
Figure 14:
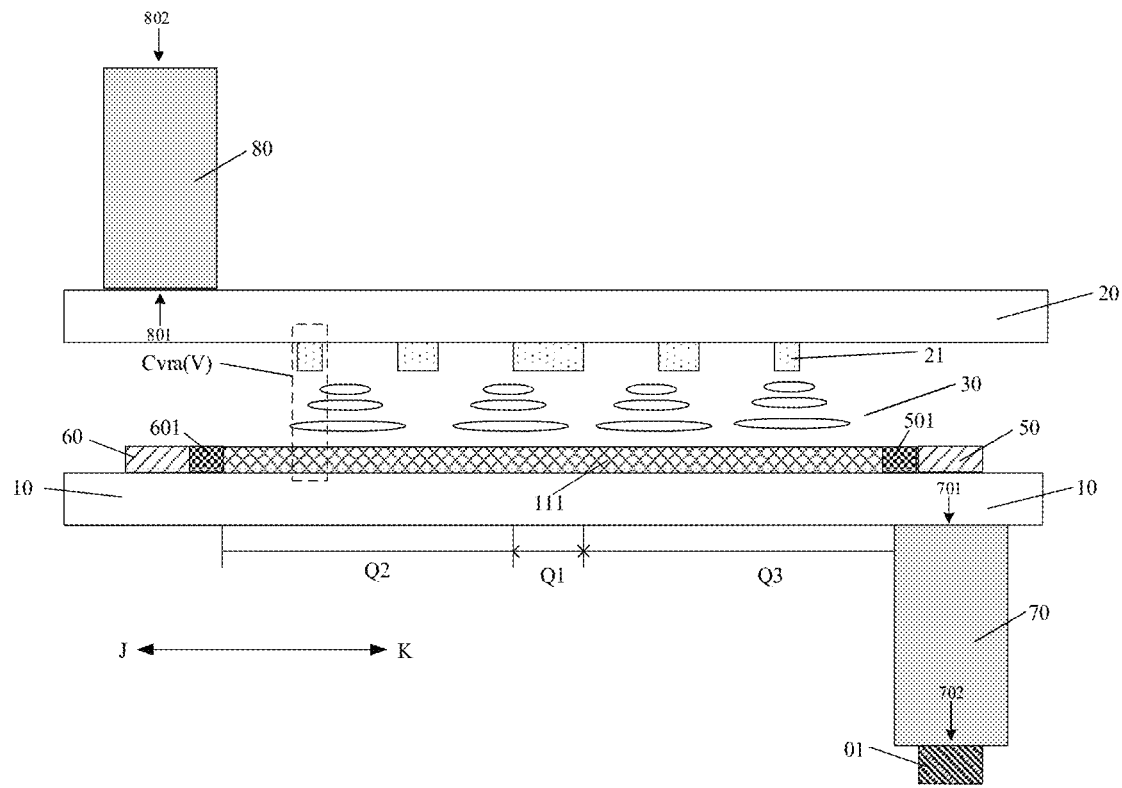
FIG. 14 is a cross-sectional view along a direction J-K in FIG. 13.

In order to solve the above problem, referring to FIGS. 13 and 14, in the embodiment of the present disclosure, the phase shifter may be divided into a first region Q1, a second region Q2 and a third region Q3 which are respectively disposed at two sides of the first region Q1 (i.e., as shown in FIG. 13, the second region Q2, the first region Q1, and the third region Q3 in a direction from left to right); wherein an overlapping area of each patch electrode 21 and each branch structure 112 forming each of the variable capacitors Cvra(V) in the second region Q2 and the third region Q3 is smaller than that of the patch electrode 21 and the branch structure 112 forming the variable capacitor Cvra(V) in the first region Q1; and there is only one variable capacitor Cvra(V) corresponding to one overlapping area in the first region Q1.

When there are a plurality of variable capacitors Cvra(V) in each of the second region Q2 and the third region Q3, for any two variable capacitors Cvra(V) located on the same side of the first region Q1, an overlapping area of the patch electrode 21 and the branch structure 112 forming the variable capacitor Cvra(V) close to the first region Q1 is greater than or equal to that of the patch electrode 21 and the branch structure 112 forming the variable capacitor Cvra(V) far away from the first region Q1.

It should be noted that the overlapping area refers to an area of orthogonal projections of the patch electrode 21 and the branch structure 112 on the first base plate 10 (or the second base plate 20) overlapping with each other.

Figure 15:
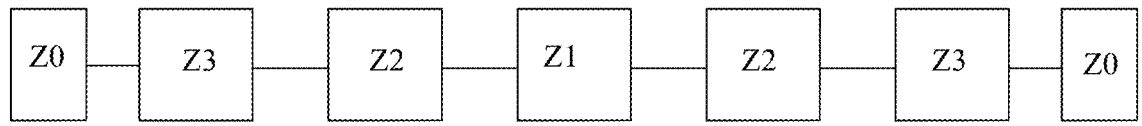
FIG. 15 is a diagram illustrating a change in impedance of the phase shifter of FIG. 13.

In the embodiment of the present invention, for any two variable capacitors Cvra(V) located on the same side of the first region Q1, an overlapping area of the patch electrode 21 and the branch structure 112 forming the variable capacitor Cvra(V) close to the first region Q1 is greater than or equal to that of the patch electrode 21 and the branch structure 112 forming the variable capacitor Cvra(V) far away from the first region Q1. That is, along a length direction of the main structure 111, a capacitance value of the formed periodically variable capacitor Cvra(V) tends to increase first and then decrease, and is positively correlated with the impedance value, so that along the length direction of the main structure 111, the impedance of the phase shifter tends to increase first and then decrease (as shown in FIG. 15, along the length direction of the main structure 111, the impedance changes in accordance with Z0-Z3-Z2-Z1-Z2-Z3-Z0, where Z1>Z2>Z3>Z0). It may be understood that the microwave signal is introduced from both ends of the main structure 111 of the signal line 11, so that the problem of large transmission loss due to reflection of the microwave signal after passing through the periodically variable capacitors Cvra(V) caused by the large capacitance value of each variable capacitor Cvra(V) may be avoided as much as possible.

In some embodiments, the number of the variable capacitors Cvra(V) located in the first region Q1 is only one. That is, only one patch electrode and one branch structure 112 are disposed in the first region Q1, and orthographic projections of the patch electrode and the branch structure 112 on the base plate at least partially overlap with each other to form one variable capacitor Cvra(V); and the capacitance value of the variable capacitor Cvra(V) (i.e., the overlapping area of the patch electrode and the branch structure 112) should be designed such that the microwave signal may be phase-shifted by 360° or above after passing through the first region Q1, the second region Q2, and the third region Q3.

In some embodiments, the overlapping areas corresponding to the variable capacitors Cvra(V) formed in the second region Q2 and/or in the third region Q3 are different from each other. Preferably, the overlapping areas corresponding to the variable capacitors Cvra(V) formed in each of the second region Q2 and the third region Q3 gradually become greater in a direction toward the first region Q1. That is, the capacitance values of the variable capacitors Cvra(V) formed in the second region Q2 and the third region Q3 increase regularly in the direction toward the first region Q1, so that the transmission of microwave signals may be more stable, and the transmission loss may be reduced as much as possible.

In some embodiments, the variable capacitors Cvra(V) formed in the second region Q2 and the third region Q3 are the same in number, and the variable capacitors Cvra(V) formed in the two regions are symmetrically arranged with respect to the first region Q1. That is, the capacitance values (or overlapping areas) of the variable capacitors Cvra(V) formed in the second region Q2 and the third region Q3 have a same change rule in the direction toward the first region Q1. Therefore, the transmission of microwave signals may be more stable, and the transmission loss may be reduced as much as possible.

In some embodiments, as shown in FIG. 13 and FIG. 14, in order to realize different overlapping areas of the variable capacitors Cvra(V), the branch structures 112 in the variable capacitors Cvra(V) are set to have a same length, and different widths, so that for any two variable capacitors Cvra(V) located on the same side of the first region Q1, the overlapping area of the patch electrode 21 and the branch structure 112 forming the variable capacitor Cvra(V) close to the first region Q1 is greater than or equal to that of the patch electrode 21 and the branch structure 112 forming the variable capacitor Cvra(V) far away from the first region Q1.

In some embodiments, distances between any two adjacent variable capacitors Cvra(V) are the same. At this time, distances d between any two adjacent patch electrodes 21 may be set to the same, while distances between any two adjacent branch structures 112 may also be set to the same. Alternatively, distances between any two adjacent variable capacitors Cvra(V) (or any two adjacent patch electrodes 21 or any two adjacent branch structures 112) may be designed to monotonically increase or decrease according to a certain rule; the distances between the variable capacitors Cvra(V) (or the patch electrodes 21 or the branch structures 112) may also be designed to be different from each other, and do not have a certain arrangement rule, which is not limited in the embodiment of the present invention.

If the phase shifter provided in the embodiment of the present disclosure, where CPW is periodically loaded with the variable capacitor, is applied to an array antenna, a distance between the array antennas necessarily meets a requirement (the distance generally ranges from $0.5\lambda$ to $0.6\lambda$), where $\lambda$ is a vacuum wavelength of a microwave signal corresponding to a operating frequency of the phase shifter. Therefore, in order to meet the requirement, the phase shifter which may be provided under each radiation unit has an area of only $0.5 \times 0.5\lambda$, with a phase shift angle of 360 degrees, so that the CPW transmission lines need to be bent to a certain extent.

Figure 16:
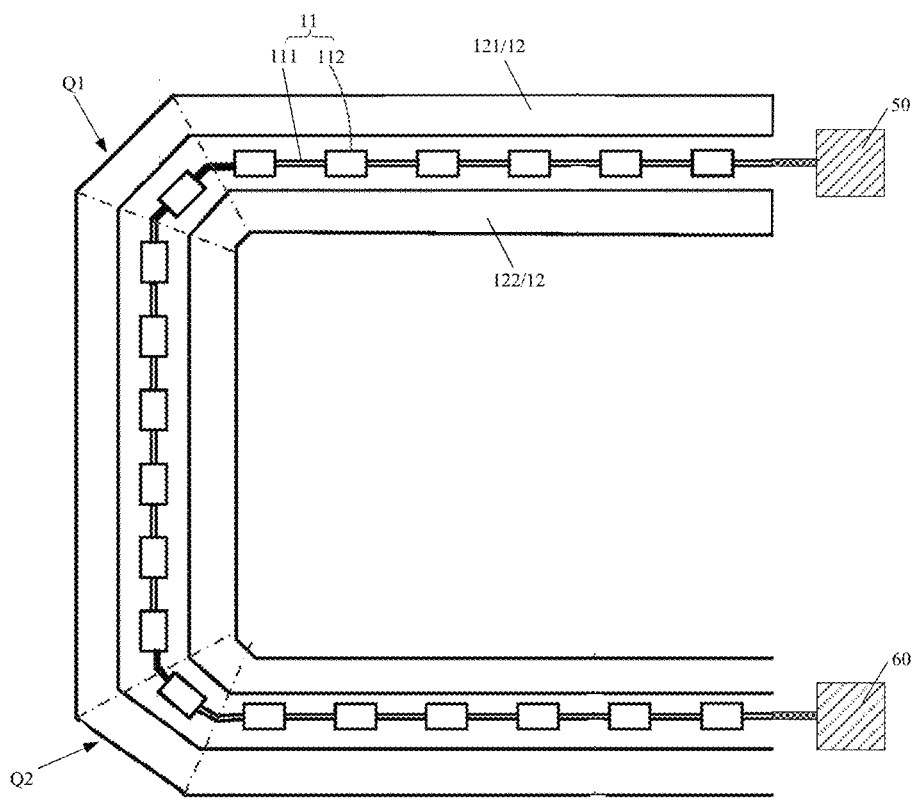
FIG. 16 is a top view of a phase shifter according to an embodiment of the present disclosure (folded arrangement).

In some examples, as shown in FIG. 16, the signal line 11 of the CPW transmission line has at least one bending angle, and accordingly, the reference electrode 12 (including the first sub-reference electrode 121 and the second sub-reference electrode 122) also has at least one bending angle. The bending angles of the reference electrode 12 are arranged in one-to-one correspondence with the bending angles of the signal line 11. That is, at one bending angle of the signal line 11, the reference electrode 12 is also bent along a bending direction of the bending angle. For example, as shown in FIG. 16, the signal line 11 has two bending angles, and therefore, may be divided into three portions, i.e., a first portion and a second portion extending along a third direction, and a third portion disposed between the first portion and the second portion and extending along a fourth direction. The third direction and the fourth direction may be approximately perpendicular to each other. A first bending angle is formed at a joint of the first portion and the third portion; a second bending angle is formed at a joint of the second portion and the third portion. The first portion, the second portion and the third portion are connected to each other in sequence, such that the signal line 11 is in a U-shaped arrangement, and thus, the reference electrode 12 is also in a U-shaped arrangement along the arrangement direction of the signal line 11. The signal line 11 and the reference electrode 12 may also be in a ring shape arrangement, an S-shaped arrangement, and the like. In a case of the U-shape arrangement, there are 2 sub-corner regions. In a case of the ring shape arrangement, there are 4 sub-corner regions. In a case of the S-shaped arrangement, there are a plurality of sub-corner regions, which are not limited herein.

In some examples, the first and/or second waveguide structures 70, 80 may have a filling medium therein to increase the dielectric constant of the entirety thereof, so that the first and second waveguide structures 70, 80 may be reduced in size. The filling medium may include a variety of media. For example, the filling medium may be polytetrafluoroethylene.

In some embodiments, the first base plate 10, the second base plate 20, and the third base plate 03 may be formed by using various types of dielectric substrates, such as, a glass substrate with a thickness of 100 to 1000 micrometers, or a sapphire substrate, or a polyethylene terephthalate substrate, a triallyl cyanurate substrate and a transparent flexible polyimide substrate with a thickness of 10 to 500 micrometers, or a foam substrate, a printed circuit board (PCB), and the like.

In some embodiments, the patch electrode 21, the branch structure 112, the main structure 111, the reference electrode 12, the first feeding structure 50, the second feeding structure 60, the first connection structure 501, and the second connection structure 601 may be made of metal materials, such as aluminum, silver, gold, chromium, molybdenum, nickel, or iron and the like.

In a second aspect, the present disclosure provides an antenna, including at least one phase shifter described above. In some examples, the antenna may further include at least one radiation unit 90, where one radiation unit 90 is disposed corresponding to the second port 802 of the second waveguide structure 80 of one phase shifter. That is, if the antenna is used as the transmitting antenna, a signal is coupled to the first port 801 of the second waveguide structure 80 through the second feeding structure 60, and then transmitted to the radiation unit 90 corresponding to the second port 802 of the second waveguide structure 80 through the second port 802 of the second waveguide structure 80; if the antenna is used as the receiving antenna, the signal received by the radiation unit 90 is transmitted to the second port 802 of the second waveguide structure 80 corresponding to the radiation unit 90, and then coupled to the second feeding structure 60 through the first port 801 of the second waveguide structure 80. The antenna provided by the embodiment of the present disclosure may include any number of radiation units 90. Accordingly, each radiation unit 90 is connected to one phase shifter, which adjusts the phase of the radiation unit 90, so that in the array antenna, phases of a plurality of radiation units 90 are adjusted to control a transmission direction of a beam, thereby forming a phased array antenna. It will be described below by taking the radiation units 90 arranged in a 1×3 array as an example.

Figure 17:
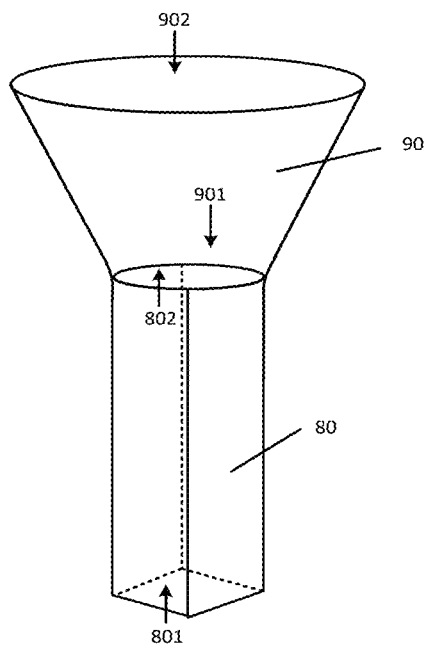
FIG. 17 is a schematic structural diagram of a radiation unit of an antenna according to an embodiment of the present disclosure (horn antenna).
Figure 18:
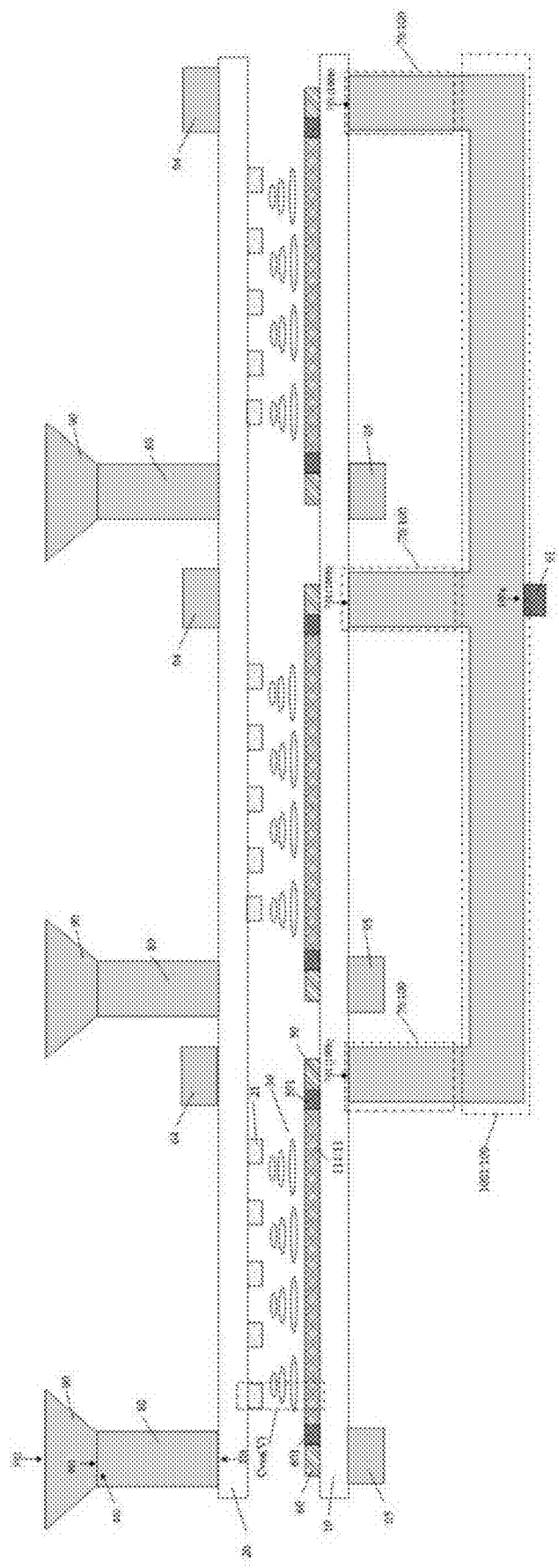
FIG. 18 is a side view of an antenna according to an embodiment of the present disclosure.

In some examples, referring to FIGS. 17 and 18, the radiation unit 90 may include multiple types of structures, for example, the waveguide structure or the radiation patch. The radiation unit 90 is the waveguide structure as an example. Specifically, the radiation unit 90 may be the third waveguide structure, including a first port 901 close to the second waveguide structure 80 and a second port 902 away from the second waveguide structure 80, and the first port 901 of the third waveguide structure is connected to the second port 802 of the second waveguide structure 80 corresponding to the third waveguide structure.

An aperture of a second port of the third waveguide structure is greater than that of the first port, and the third waveguide structure (the radiation unit 90) may be a horn antenna. Specifically, referring to FIG. 17, the aperture of the third waveguide structure relatively distal to the second waveguide structure 80 is not less than the aperture of the third waveguide structure relatively proximal to the second waveguide structure 90. That is, the aperture of the third waveguide structure gradually increases along a direction from the first port 901 to the second port 902 of the third waveguide structure, so as to form a horn-shaped cavity. In some examples, the third waveguide structure may be integrally formed with the second waveguide structure to simplify the process.

In some examples, referring to FIG. 17, if the second waveguide structure 80 is a rectangular waveguide, that is, the second waveguide structure 80 includes four second sidewalls, the four second sidewalls are connected successively to define a waveguide cavity of the second waveguide structure 80. The first port 901 of the third waveguide structure is connected to the second port 802 of the second waveguide structure 80 corresponding to the third waveguide structure. The waveguide cavity of the first waveguide structure is horn-shaped; the third waveguide structure includes one third sidewall, which defines the waveguide cavity of the third waveguide structure. An extending direction of the third sidewall intersects with an extending direction of the second base plate 20. Since the first port 901 of the third waveguide structure is connected to the second port 802 of the second waveguide structure 80 corresponding to the third waveguide structure, a shape of the waveguide cavity of the second waveguide structure 80 gradually transitions to a shape of the first port 901 of the third waveguide cavity along a direction from the second waveguide cavity to the third waveguide cavity (the radiation unit 90). That is, the rectangular cavity of the second waveguide structure 80 gradually transits to the circular aperture at the lower end of the third waveguide cavity (the rectangular cavity transits to the circular aperture), to form an integrated waveguide cavity, so that when a microwave signal is transmitted, rectangular-circular transition may be realized, the transmission loss of the rectangular waveguide cavity of the second waveguide structure 80 at the lower end is small, and the rectangular waveguide cavity gradually transits to the waveguide cavity of the horn-shaped third waveguide structure 80 at the upper end, so that a circularly polarized microwave signal is realized. That is, an included angle between a polarization plane of the microwave signal and the earth normal plane periodically changes from 0 to 360°. In some examples, a raised electrode may be provided on an inner wall of the third waveguide cavity to implement an antenna with a left-hand or right-hand circular polarization.

In some examples, with continued reference to FIG. 18, the antenna includes a plurality of radiation units 90 and a plurality of phase shifters, and one radiation unit 90 is disposed corresponding to the second port 702 of the first waveguide structure of one phase shifter; each phase shifter has one first waveguide structure 70; the first waveguide structures 70 of the plurality of phase shifters are connected together to form a waveguide power division network 100, which has one main port 100a and a plurality of sub-ports 100b.

The main port 100a of the waveguide power dividing network 100 is connected to an external signal line. For example, the main port 100a may be connected to the signal connector 01. The main port 100a receives a signal transmitted through the external signal line, and divides the signal into a plurality of sub-signals, each of which is output through one sub-port 100b. Specifically, the waveguide power dividing network 100 may have one main waveguide structure 1001 extending in a direction parallel (or approximately parallel) to the first base plate 10. The main port 100a may be disposed at half a length of the main waveguide structure 1001 in the extending direction. The plurality of first waveguide structures 70 may extend in a direction perpendicular (or approximately perpendicular) to the first base plate 10. The second ports 702 of the plurality of first waveguide structures 70 are connected to the main waveguide structure 1001; the first port 701 of each first waveguide structure 70 serves as a sub-port 100b of the waveguide power dividing network; the main port 100a receives a signal and divides the signal into a plurality of sub-signals, each of which enters one first waveguide structure 70 and is coupled to the corresponding first feeding structure 50 of the first waveguide structure 70 through the first port 701 of the first waveguide structure 70.

Figure 19:
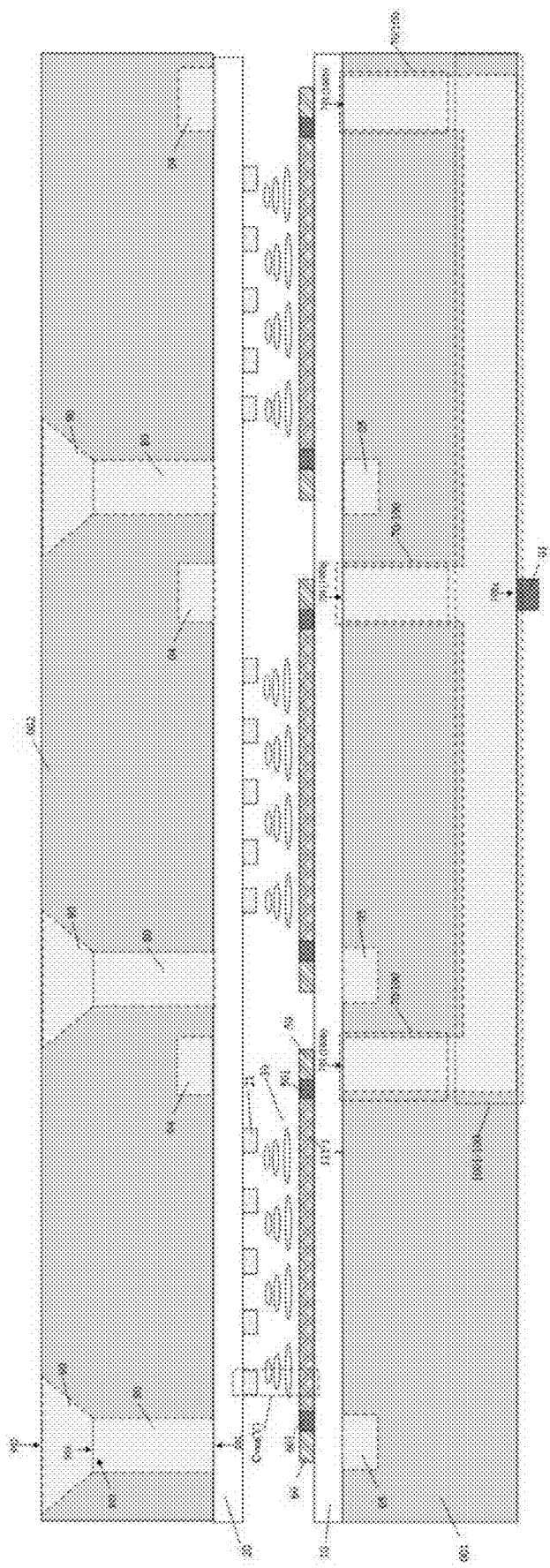
FIG. 19 is a side view of an antenna according to an embodiment of the present disclosure (a cavity within a metal layer forming a waveguide structure).

In some examples, similar to the above, referring to FIG. 19, the first waveguide structure 70, the second waveguide structure 80, and the plurality of radiation units 90 that are the third waveguide structures of the plurality of phase shifters may be formed by cavities in a metal block. Taking as an example that the first waveguide structure 70 and the second waveguide structure 80 are disposed on different sides, the antenna may include a first metal layer 001 and a second metal layer 002. The first metal layer 001 is disposed on a side of the first base plate 10 distal to the dielectric layer 30, has a plurality of hollow first cavities therein each having a shape like the shape of the first waveguide structure 70, for defining the first waveguide structures 70 of the plurality of phase shifters, and the plurality of first cavities are connected together to form a waveguide power dividing network. Similarly, the second metal layer 002 is disposed on a side of the second base plate 20 distal to the dielectric layer 30, has a plurality of hollow second cavities and a plurality of hollow fifth cavities therein; each second cavity has a shape like the shape of the second waveguide structure 80, for defining the second waveguide structures 80 of the plurality of phase shifters; and each fifth cavity has a shape like the shape of the third waveguide structure, for defining a plurality of radiation units 90 as the third waveguide structures. In some examples, the second waveguide structure 80 and the third waveguide structure may be integrally formed, and are formed to be connected to each other in the second metal layer 002 through a single process. If the phase shifter of the antenna has the first reflective structure 04 and the second reflective structure 05 therein, the second metal layer 002 further has a third cavity therein to define the first reflective structure 04, and the first metal layer 001 further has a fourth cavity therein to define the second reflective structure 05. If the first waveguide structure 70 and the second waveguide structure 80 are disposed on the same side, the antenna may only include the second metal layer 002, which is disposed on the side of the second base plate 20 distal to the dielectric layer 30, has a plurality of first cavities, a plurality of second cavities, and a plurality of fifth cavities therein; each of the plurality of first cavities has a shape like the shape of the first waveguide structure 70, for defining the first waveguide structure 70; and the plurality of first cavities are connected together to form the waveguide power dividing network. Each second cavity has a shape like the shape of the second waveguide structure 80, for defining the second waveguide structures 80; and each fifth cavity has a shape like the shape of the third waveguide structure, for defining a plurality of radiation units 90. In this way, orthographic projections of the plurality of first cavities on the second base plate 20 are not overlapped with orthographic projections of the plurality of second cavities on the second base plate 20, and are not overlapped with orthographic projections of the plurality of fifth cavities on the second base plate 20, so that the waveguide cavities of the first waveguide structure 70 and the second waveguide structure 80 (and the third waveguide structure) are independent from each other and do not influence each other. If the phase shifter has the first reflective structure 04 and the second reflective structure 05, a third metal layer 003 may be disposed on a side of the first base plate 10 distal to the dielectric layer 30, have a third cavity for defining the first reflective structure 04 and a fourth cavity for defining the second reflective structure 05. Since lengths of the first and second reflective structures 04 and 05 each are less than each of lengths of the first and second waveguide structures 70 and 80, a thickness of the first metal layer 003 is also less than that of the second metal layer 002.

Figure 20:
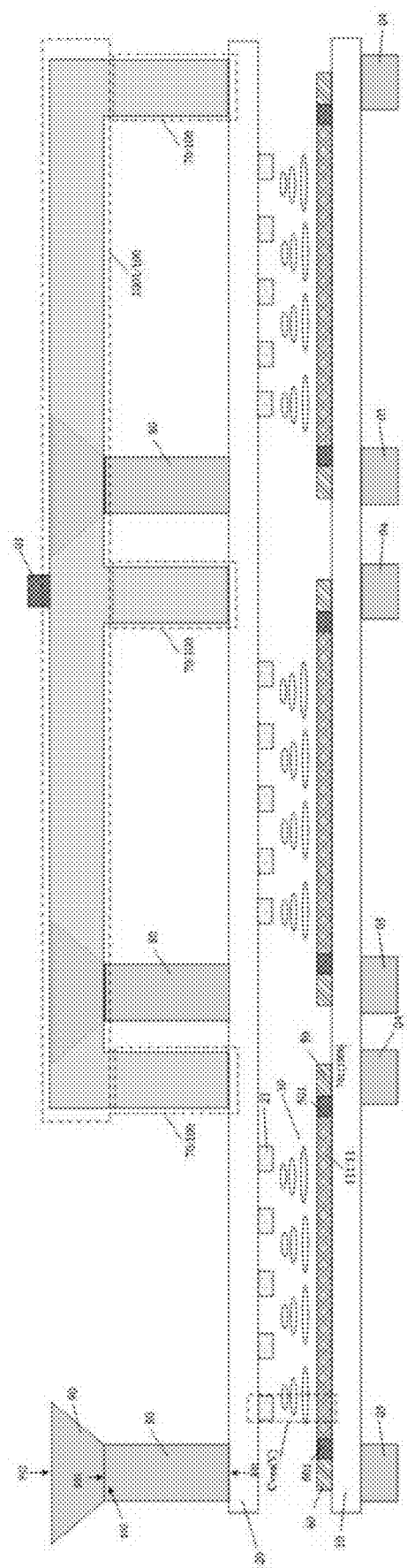
FIG. 20 is a side view of an antenna according to an embodiment of the present disclosure (a waveguide power dividing network disposed on the same side as a second waveguide structure and a radiation unit).
Figure 21:
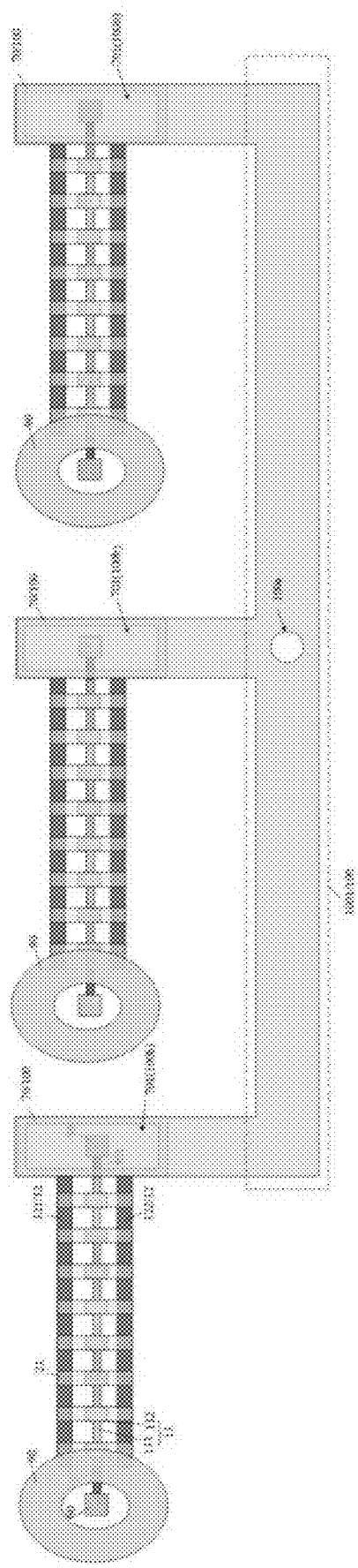
FIG. 21 is a top view of the antenna of FIG. 20.

In some examples, referring to FIGS. 20 and 21, if the first waveguide structure 70, the second waveguide structure 80, and the radiation unit 90 as the third waveguide structure in the phase shifter are formed by hollow pipes made of metal walls, that is, formed by connecting at least one sidewall, and the first waveguide structure 70 and the second waveguide structure 80 are disposed on the same side, the plurality of first waveguide structures 70 are connected together by the main waveguide structure 1001 to form the waveguide power division network 100; the main waveguide structure 1001 of the waveguide power division network 100 has an aperture as the main port 100a; and the signal connector 01 is inserted into the waveguide power division network 100 through the main port 100a to input a signal to the waveguide power division network 100. The waveguide power division network 100 is provided on the side of the second base plate 20 distal to the dielectric layer 30; the plurality of radiation units 90 are connected to corresponding second waveguide structures 80 and are provided on the side of the second base plate 20 distal to the dielectric layer 30. Referring to FIG. 21, orthographic projections of the waveguide power distribution network 100 on the second base plate 20 are not overlapped with orthographic projections of the plurality of second waveguide structures 80 and the plurality of radiation units 90 on the second base plate 20, such that the waveguide power distribution network 100 and the plurality of second waveguide structures 80 and the plurality of radiation units 90 are independent from each other and do not influence each other. It should be noted that the arrangement of the waveguide power division networks in FIGS. 20 and 21 is only an example, and the waveguide power division networks may be arranged on the second base plate 20 along any direction, as long as the waveguide power division networks are independent from the plurality of second waveguide structures 80 and the plurality of radiation units 90, which is not limited herein.

Figure 22:
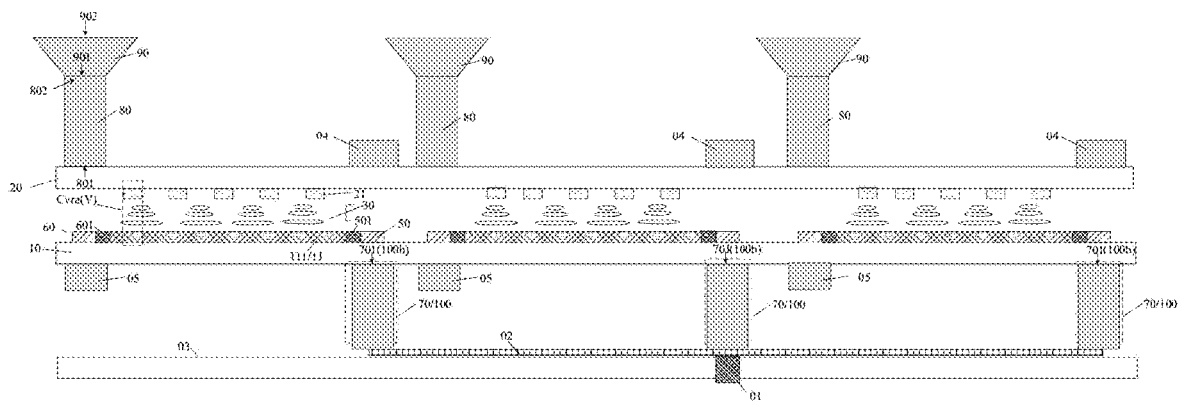
FIG. 22 is a side view of an antenna according to an embodiment of the present disclosure (with a third substrate).
Figure 23:
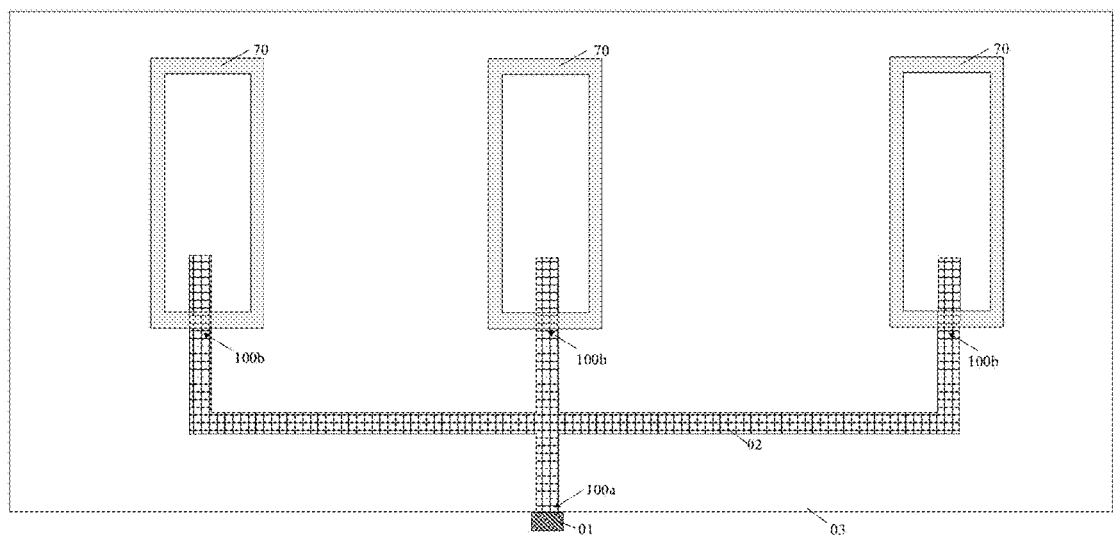
FIG. 23 is a top view of the third substrate of the antenna of FIG. 22.

In some examples, referring to FIGS. 22 and 23, the antenna provided by the embodiment of the present disclosure may further include the third substrate connected to the second ports 702 of the plurality of first waveguide structures 70. The third substrate includes the third base plate 03 and the feeding transmission line 02; the third base plate 03 is connected to the second ports 702 of the plurality of first waveguide structures 70; and the feeding transmission line 02 is disposed on the side of the third base plate 03 proximal to the first waveguide structure 70. Referring to FIG. 22, the feeding transmission line 02 is arranged as a power division feeding structure, which has a main line segment and a plurality of sub-line segments. The main port 100a is provided at a midpoint of the main line segment in a length direction; the main line segment extends to an edge of the third base plate 03 to be connected to the external signal line.

Specifically, the signal connector 01 may be disposed on an edge of the third base plate 03, and has one end connected to the main port 100a of the power division feeding structure formed by the feeding transmission line 02, and the other end connected to the external signal line, so as to input a signal to the power division feeding structure. First ends of the plurality of sub-line segments of the power division feeding structure formed by the feeding transmission line 02 are connected to the main line segment, and second ends of the sub-line segments as sub-ports 100b extend to a second port 702 of one first waveguide structure 70, so as to feed sub-signals into the waveguide cavity of the first waveguide structure 70. In particular, the second end of each sub-line segment may extend into the second port 702 of the first waveguide structure 70 to which the signal is to be fed, i.e. an orthographic projection of the second end of the sub-line segment on the first base plate 10 is located in an orthographic projection of the second port 702 of the first waveguide structure 70 on the first base plate 10.

Figure 24:
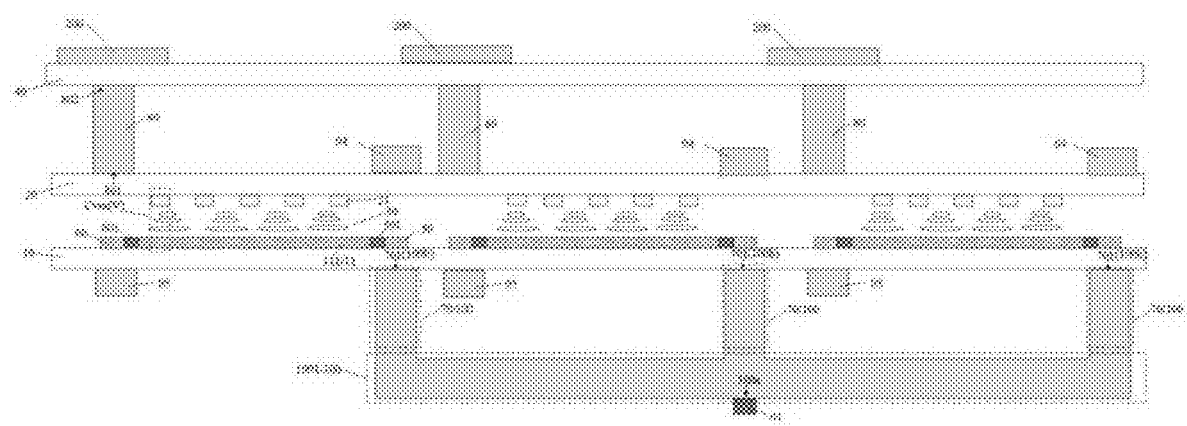
FIG. 24 is a side view of an antenna according to an embodiment of the present disclosure (radiation patch).
Figure 25:
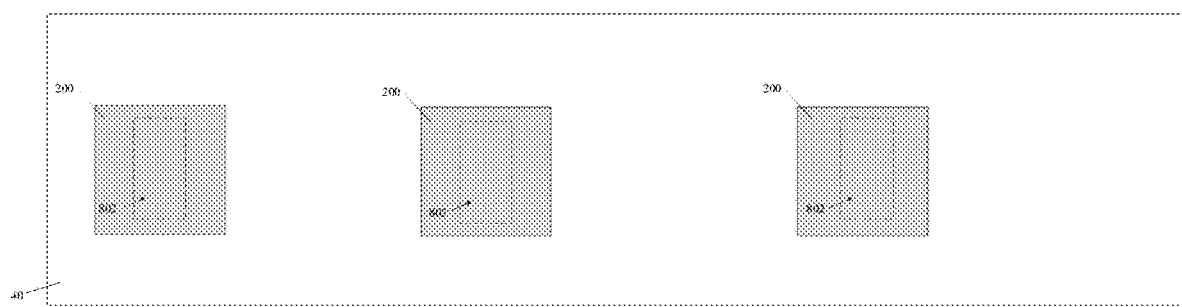
FIG. 25 is a top view of the antenna of FIG. 24.

In some examples, referring to FIGS. 24 and 25, a dashed box in FIG. 25 indicates an orthographic projection of the second port 802 of the second waveguide structure 80 on the fourth substrate 40. In the antenna provided in the embodiment of the present disclosure, at least one radiation unit 90 may also adopt a radiation patch, and the antenna may further include the fourth substrate 40. The second port 802 of the second waveguide structure 80 of one phase shifter in the antenna corresponds to one radiation unit 90. That is, the second waveguide structure 80 of one phase shifter outputs a signal to one radiation unit 90 which is a radiation patch (or receives a signal transmitted by the radiation unit 90); the second port 802 of the second waveguide structure 80 of at least one phase shifter is connected to the fourth substrate 40; the radiation patch may be disposed on a side of the fourth substrate 40 distal to the second port 802 of the second waveguide structure 80; the second waveguide structure 80 feeds a signal to the radiation unit 90 in an aperture coupling manner. That is, an orthographic projection of the radiation unit 90 as the radiation patch on the fourth substrate 40 is at least partially overlapped with an orthographic projection of the second port 802 of the second waveguide structure 80 corresponding to the radiation patch on the fourth substrate, so that a microwave signal output at the second port 802 of the second waveguide structure 80 may pass through the fourth substrate 40, be coupled to the radiation unit 90 overlapped with the second port 802 of the second waveguide structure 80, and then be radiated by the radiation unit 90, or be coupled to the second port 802 of the second waveguide structure 80 overlapped with the radiation unit 90 through the fourth substrate 90 after the radiation unit 90 receives the signal. In some examples, an orthographic projection of the radiation unit 90 as the radiation patch on the fourth substrate 40 may cover an orthographic projection of the second port 802 of the second waveguide structure 80 on the fourth substrate 40. In some examples, if a shape of the radiation unit 90 is a centrosymmetric pattern and a shape of the second port 802 of the second waveguide structure 80 is a midline symmetric pattern, a distance between an orthographic projection of the symmetry center of the radiation unit 90 on the fourth substrate 40 and an orthographic projection of the symmetry center of the second port 802 of the second waveguide structure 80 on the fourth substrate 40 is not greater than a third preset value, which should be as small as possible, for example, less than 0.1 cm. If the third preset value is 0, the radiation unit 90 and the second port 802 of the second waveguide structure 80 are completely opposite to each other, and their centers of symmetry coincide with each other.

In some examples, the fourth substrate 40 may be various types of dielectric substrates, such as, a glass substrate with a thickness of 100 to 1000 micrometers, or a sapphire substrate, or a polyethylene terephthalate substrate, a triallyl cyanurate substrate and a transparent flexible polyimide substrate with a thickness of 10 to 500 micrometers, or a foam substrate, a printed circuit board (PCB), and the like.

Figure 26:
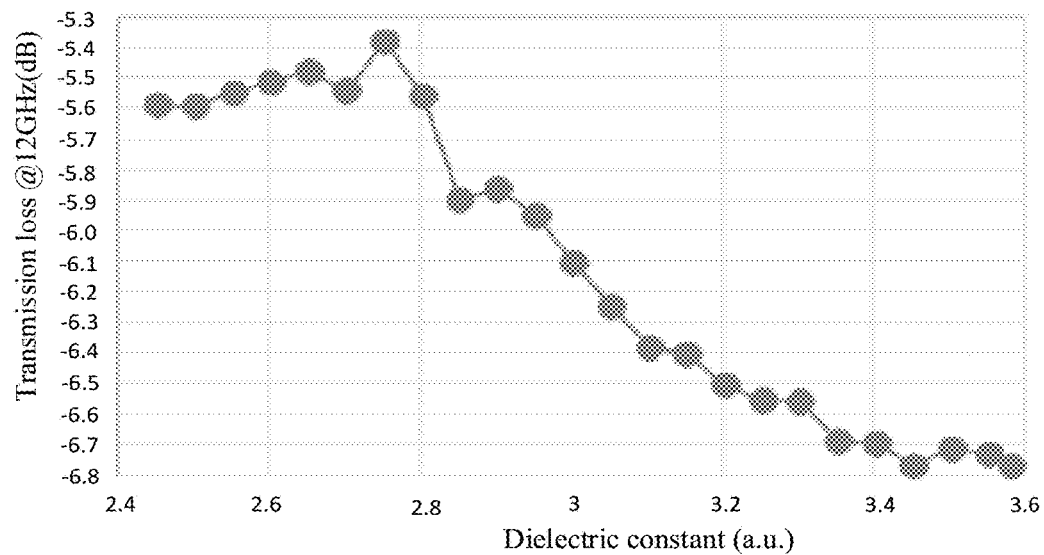
FIG. 26 is a simulation graph of dielectric constant VS transmission loss of an antenna according to an embodiment of the present disclosure.
Figure 27:
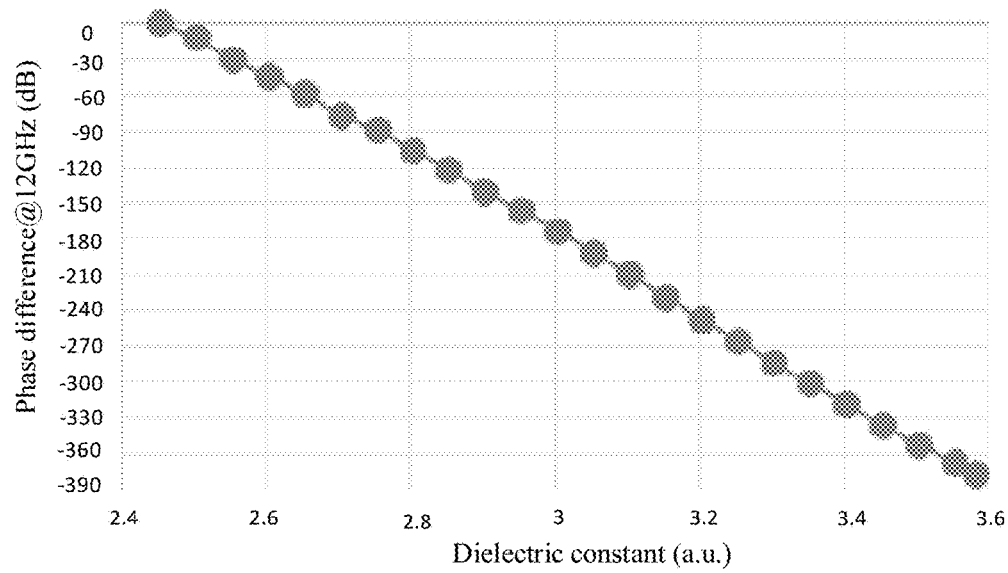
FIG. 27 is a simulation graph of dielectric constant VS phase difference of an antenna according to an embodiment of the present disclosure.

Referring to FIGS. 26 and 27, FIGS. 26 and 27 are graphs of simulation results of a simulation using the antenna shown in FIG. 18 as an example. FIG. 26 is a graph of dielectric constant & transmission loss of the antenna. FIG. 27 is a graph of dielectric constant & phase difference of the antenna. As may be seen from the above figures, the antenna provided by the embodiment of the present disclosure has a fluctuation of the transmission loss of only 1.8 at respective dielectric constants, and the phase shift degree may be maintained, so that the transmission loss may be effectively reduced by using the waveguide structure (including the first waveguide structure 70 and the second waveguide structure 80) and the feeding structure (including the first feeding structure 50 and the second feeding structure 60) for signal transmission.

It should be understood that the above embodiments are merely exemplary embodiments adopted to explain the principles of the present disclosure, and the present disclosure is not limited thereto. It will be apparent to one of ordinary skill in the art that various changes and modifications may be made therein without departing from the spirit and scope of the present disclosure, and such changes and modifications also fall within the scope of the present disclosure.

What is claimed is:

1. A phase shifter, comprising: a first substrate and a second substrate opposite to each other, and a dielectric layer between the first substrate and the second substrate; wherein,
   the first substrate comprises: a first base plate; a signal line and a reference electrode on a side of the first base plate proximal to the dielectric layer; and the signal line comprises a main structure, and at least one branch structure connected to the main structure and along an extending direction of the main structure;
   the second substrate comprises: a second base plate, and at least one patch electrode on a side of the second base plate proximal to the dielectric layer; the at least one patch electrode and the at least one branch structure are in a one-to-one correspondence with each other to form at least one variable capacitor; and orthographic projections of the at least one patch electrode and the at least one branch structure on the first base plate are at least partially overlapped with each other;
   the phase shifter further comprises: a first feeding structure electrically connected to one end of the signal line, and a second feeding structure electrically connected to the other end of the signal line; the first feeding structure is configured to change a transmission direction of a microwave signal through the signal line, so that the microwave signal is transmitted in a first direction, which intersects with a plane in which the first base plate is located; the second feeding structure is configured to change a transmission direction of the microwave signal through the signal line, so that the microwave signal is transmitted in a second direction, which intersects with the plane in which the first base plate is located.

2. The phase shifter of claim 1, wherein the phase shifter further comprises: a first waveguide structure corresponding to the first feeding structure; and an orthographic projection of the first feeding structure on the first base plate at least partially overlaps with an orthographic projection of a first port of the first waveguide structure on the first base plate.

3. The phase shifter of claim 2, wherein
the phase shifter further comprises: a second waveguide structure corresponding to the second feeding structure; and
an orthographic projection of the second feeding structure on the first base plate at least partially overlaps an orthographic projection of a first port of the second waveguide structure on the first base plate.

4. The phase shifter of claim 3, wherein the orthographic projection of the first feeding structure on the first base plate is within the orthographic projection of the first port of the first waveguide structure on the first base plate; and/or
the orthographic projection of the second feeding structure on the first base plate is within the orthographic projection of the first port of the second waveguide structure on the first base plate.

5. The phase shifter of claim 3, wherein the first waveguide structure is on a side of the first base plate distal to the dielectric layer and the second waveguide structure is on a side of the second base plate distal to the dielectric layer; or
the first waveguide structure and the second waveguide structure are both on the side of the second base plate distal to the dielectric layer, and the orthographic projection of the first waveguide structure on the second base plate does not overlap with the orthographic projection of the second waveguide structure on the second base plate.

6. The phase shifter of claim 3, wherein the phase shifter further comprises: a first reflective structure and a second reflective structure;
the first reflective structure is on a side of the first feeding structure distal to the first waveguide structure; an orthographic projection of the first reflective structure on the first base plate at least partially overlaps with the orthographic projection of the first port of the first waveguide structure on the first base plate and at least partially overlaps with the orthographic projection of the first feeding structure on the first base plate, and the first reflective structure is configured to reflect a microwave signal, which is radiated by the first feeding structure towards a side distal to the first waveguide structure, back into the first waveguide structure; and
the second reflective structure is on a side of the second feeding structure distal to the second waveguide structure; an orthographic projection of the second reflective structure on the second base plate at least partially overlaps with an orthographic projection of the first port of the second waveguide structure on the second base plate, and at least partially overlaps with an orthographic projection of the second feeding structure on the second base plate, and the second reflective structure is configured to reflect a microwave signal, which is radiated by the second feeding structure towards a side distal to the second waveguide structure, back into the second waveguide structure.

7. The phase shifter of claim 6, wherein the first reflective structure is a waveguide structure and an orthographic projection of a first port of the first reflective structure on the first base plate at least partially overlaps with the orthographic projection of the first port of the first waveguide structure on the first base plate; and
the second reflective structure is a waveguide structure, and an orthographic projection of a first port of the second reflective structure on the second base plate at least partially overlaps with the orthographic projection of the first port of the second waveguide structure on the second base plate.

8. The phase shifter of claim 3, wherein the first waveguide structure has at least one first sidewall which is connected together to form a waveguide cavity of the first waveguide structure; and/or
the second waveguide structure has at least one second sidewall which is connected together to form a waveguide cavity of the second waveguide structure.

9. The phase shifter of claim 3, wherein the phase shifter further comprises a first metal layer and a second metal layer; the first metal layer is on a side of the first base plate distal to the dielectric layer, and has a first cavity therein which defines the first waveguide structure; the second metal layer is on a side of the second base plate distal to the dielectric layer, and has a second cavity therein which defines the second waveguide structure; or
the phase shifter further comprises a second metal layer on the side of the second base plate distal to the dielectric layer; the second metal layer has a first cavity defining the first waveguide structure and a second cavity defining the second waveguide structure therein; and an orthographic projection of the first cavity on the second base plate does not overlap with an orthographic projection of the second cavity on the second base plate.

10. The phase shifter of claim 3, wherein the first waveguide structure and/or the second waveguide structure has a filling medium therein, the filling medium being polytetrafluoroethylene.

11. The phase shifter of claim 3, wherein an orthographic projection of the signal line on the first base plate does not overlap with the orthographic projections of the first port of the first waveguide structure and the first port of the second waveguide structure on the first base plate.

12. The phase shifter of claim 2, wherein the phase shifter further comprises: a third substrate connected to a second port of the first waveguide structure; the third substrate comprises a third base plate and a feeding transmission line on a side of the third base plate proximal to the first waveguide structure; and
a first end of the feeding transmission line is connected to an external signal line, and a second end of the feeding transmission line extends to the second port of the first waveguide structure so as to feed a signal into the first waveguide structure.

13. The phase shifter of claim 1, wherein the signal line has at least one bending angle, the reference electrode has at least one bending angle, and the at least one bending angle of the reference electrode is in one-to-one correspondence with the at least one bending angle of the signal line.

14. The phase shifter of claim 1, wherein the reference electrode comprises: a first sub-reference electrode and a second sub-reference electrode; the signal line is between the first sub-reference electrode and the second sub-reference electrode; an orthographic projection of each of the at least one patch electrode on the first base plate at least partially overlaps with orthographic projections of the first sub-reference electrode and the second sub-reference electrode on the first base plate.

15. The phase shifter of claim 1, wherein the first feeding structure is a monopole electrode, and the first feeding structure and the signal line are in a same layer and are made of a same material; and/or the second feeding structure is a monopole electrode, and the second feeding structure and the signal line are in a same layer and are made of a same material.

16. An antenna, comprising at least one phase shifter, each of which is the phase shifter of claim 1.

17. The antenna of claim 16, wherein the at least one phase shifter further comprises:

a second waveguide structure corresponding to the second feeding structure; and the antenna further comprises: at least one radiation unit, one of which corresponds to the second port of the second waveguide structure of one of the at least one phase shifter.

18. The antenna of claim 17, wherein the radiation unit is a third waveguide structure comprising a first port close to the second waveguide structure and a second port away from the second waveguide structure, the first port of the third waveguide structure is connected to the second port of the second waveguide structure corresponding to the third waveguide structure; wherein, an aperture of the second port of the third waveguide structure is larger than that of the first port, and an aperture of a part of the third waveguide structure relatively distal to the second waveguide structure is not smaller than that of a part of the third waveguide structure relatively proximal to the second waveguide structure, the second waveguide structure comprises four second sidewalls that are connected together to define a waveguide cavity of the second waveguide structure;

the third waveguide structure comprises a third sidewall, and the third sidewall surrounds to form a waveguide cavity of the third waveguide structure, and a shape of the waveguide cavity of the second waveguide structure gradually changes to a shape of the first port of the third waveguide cavity along a direction from the second waveguide cavity to the third waveguide cavity.

19. The antenna of claim 17, wherein the at least one phase shifter further comprises: a first waveguide structure corresponding to the first feeding structure; the antenna comprises a plurality of radiation units and a plurality of phase shifters, wherein one radiation unit corresponds to the second port of the second waveguide structure of one of the plurality of phase shifters; and the first waveguide structures of the plurality of phase shifters are connected together to form a waveguide power distribution network which has a main port and a plurality of sub-ports, the main port of the waveguide power distribution network is connected to an external signal line, and the first port of each first waveguide structure serves as a sub-port of the waveguide power distribution network.

20. The antenna of claim 17, wherein the radiation unit is a radiation patch; the antenna further comprises a fourth substrate, the second port of the second waveguide structure of the at least one phase shifter is connected to the fourth substrate, and the radiation patch is on a side of the fourth substrate distal to the second waveguide structure; and an orthographic projection of the radiation patch on the fourth substrate and an orthographic projection of the second port of the second waveguide structure corresponding to the radiation patch on the fourth substrate at least partially overlap with each other.

* * * * *